US009798125B2

(12) United States Patent
Minefuji

(10) Patent No.: US 9,798,125 B2
(45) Date of Patent: Oct. 24, 2017

(54) PROJECTION OPTICAL SYSTEM AND PROJECTOR

(71) Applicant: SEIKO EPSON CORPORATION, Tokyo (JP)

(72) Inventor: Nobutaka Minefuji, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/240,883

(22) Filed: Aug. 18, 2016

(65) Prior Publication Data

US 2016/0363746 A1  Dec. 15, 2016

Related U.S. Application Data

(63) Continuation of application No. PCT/JP2016/002721, filed on Jun. 6, 2016.

(30) Foreign Application Priority Data

Jun. 12, 2015 (JP) .................................. 2015-119002

(51) Int. Cl.
| | | |
|---|---|---|
| G02B 15/14 | (2006.01) | |
| G02B 17/08 | (2006.01) | |
| G02B 13/16 | (2006.01) | |
| G03B 21/00 | (2006.01) | |
| G03B 21/14 | (2006.01) | |
| G03B 33/12 | (2006.01) | |

(52) U.S. Cl.
CPC ......... *G02B 17/0896* (2013.01); *G02B 13/16* (2013.01); *G03B 21/005* (2013.01); *G03B 21/006* (2013.01); *G03B 21/142* (2013.01); *G03B 33/12* (2013.01)

(58) Field of Classification Search
CPC .. G03B 21/006; G03B 21/142; G03B 21/005; G02B 17/0896; G02B 13/16
USPC .................................................. 359/364, 684
See application file for complete search history.

(56) References Cited

U.S. PATENT DOCUMENTS

| | | | |
|---|---|---|---|
| 7,549,755 | B2 | 6/2009 | Suzuki |
| 8,014,075 | B2 | 9/2011 | Minefuji |
| 8,029,147 | B2 | 10/2011 | Suzuki |
| 8,071,965 | B2 | 12/2011 | Nishikawa et al. |
| 8,113,664 | B2 | 2/2012 | Nagarekawa et al. |
| 8,157,386 | B2 | 4/2012 | Nagarekawa et al. |
| 8,217,374 | B2 | 7/2012 | Nishikawa et al. |

(Continued)

FOREIGN PATENT DOCUMENTS

| | | |
|---|---|---|
| JP | 2006-235516 A | 9/2006 |
| JP | 2007-079524 A | 3/2007 |
| JP | 2009-134254 A | 6/2009 |

(Continued)

*Primary Examiner* — James Greece
(74) *Attorney, Agent, or Firm* — Oliff PLC

(57) ABSTRACT

To provide a projection optical system that can cover a wide range of magnification changes with a focus lens group in which the number of constituted lenses is decreased, and a projector including the projection optical system. A 1-2nd lens group as the focus lens group includes an F1 lens group configured of one positive lens, an F2 lens group configured of one positive lens and one negative lens, and an F3 lens group configured of one negative lens. At least the F2 lens group is caused to move when focusing is performed in response to a magnification change.

20 Claims, 23 Drawing Sheets

(56) References Cited

U.S. PATENT DOCUMENTS

2009/0257117 A1* 10/2009 Baba .................. G02B 17/08
                                                    359/364
2011/0267687 A1* 11/2011 Kim .................... G02B 17/08
                                                    359/364

FOREIGN PATENT DOCUMENTS

JP      2009-216981 A    9/2009
JP      2010-181672 A    8/2010

* cited by examiner

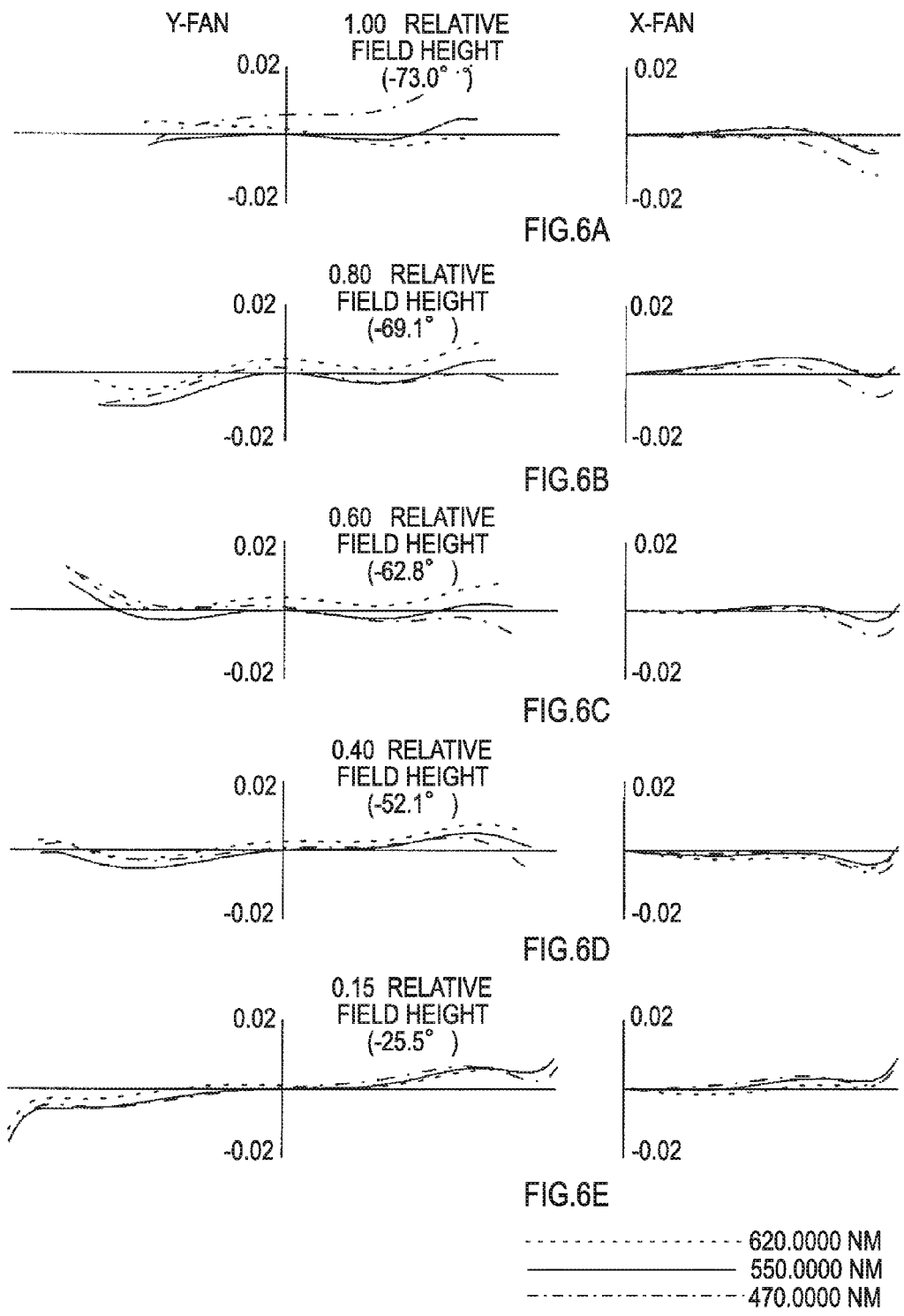

```
------------------ 620.0000 NM
―――――――――――――― 550.0000 NM
―・―・―・―・―・―・―・― 470.0000 NM
```

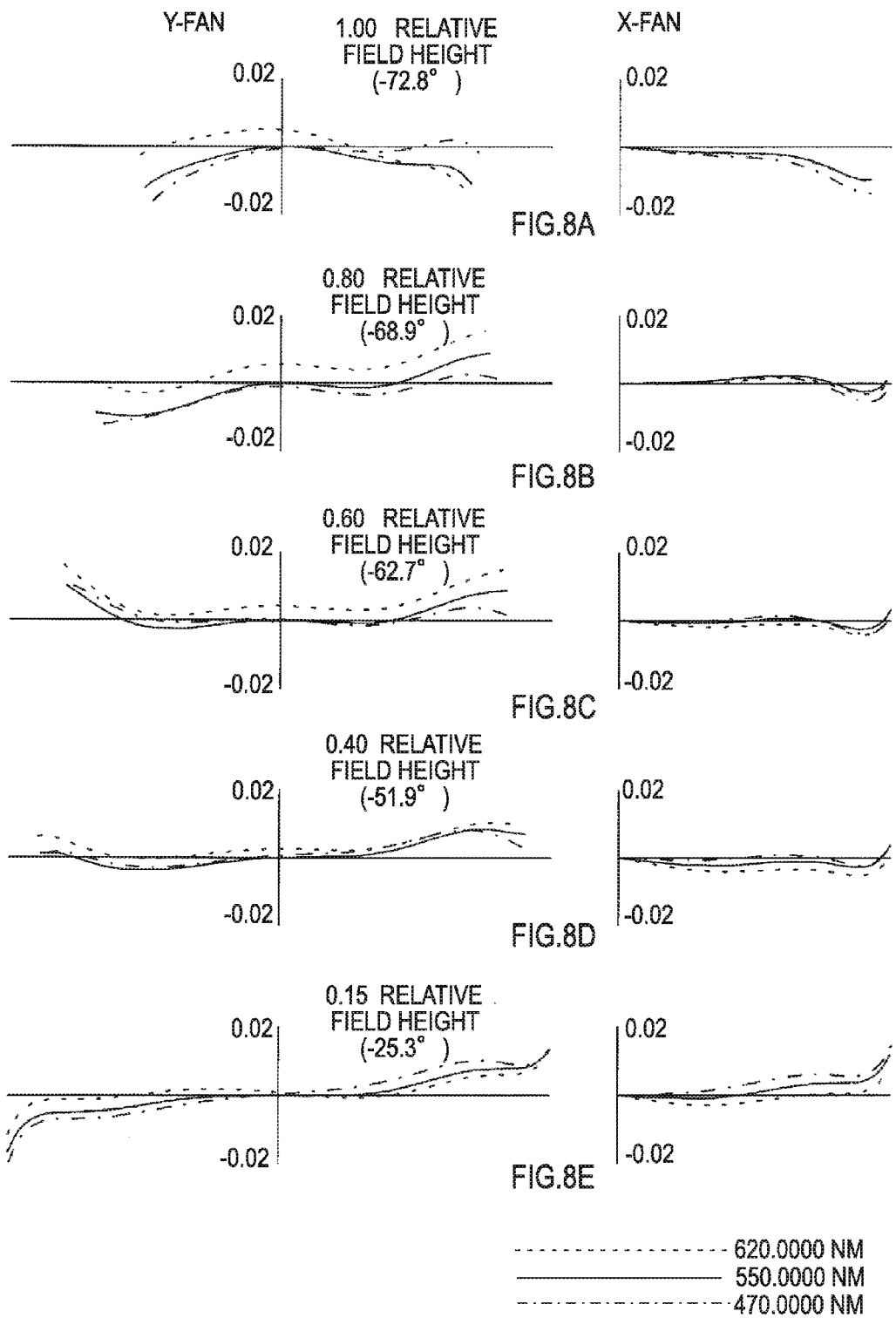

------- 620.0000 NM
——— 550.0000 NM
—·—·— 470.0000 NM

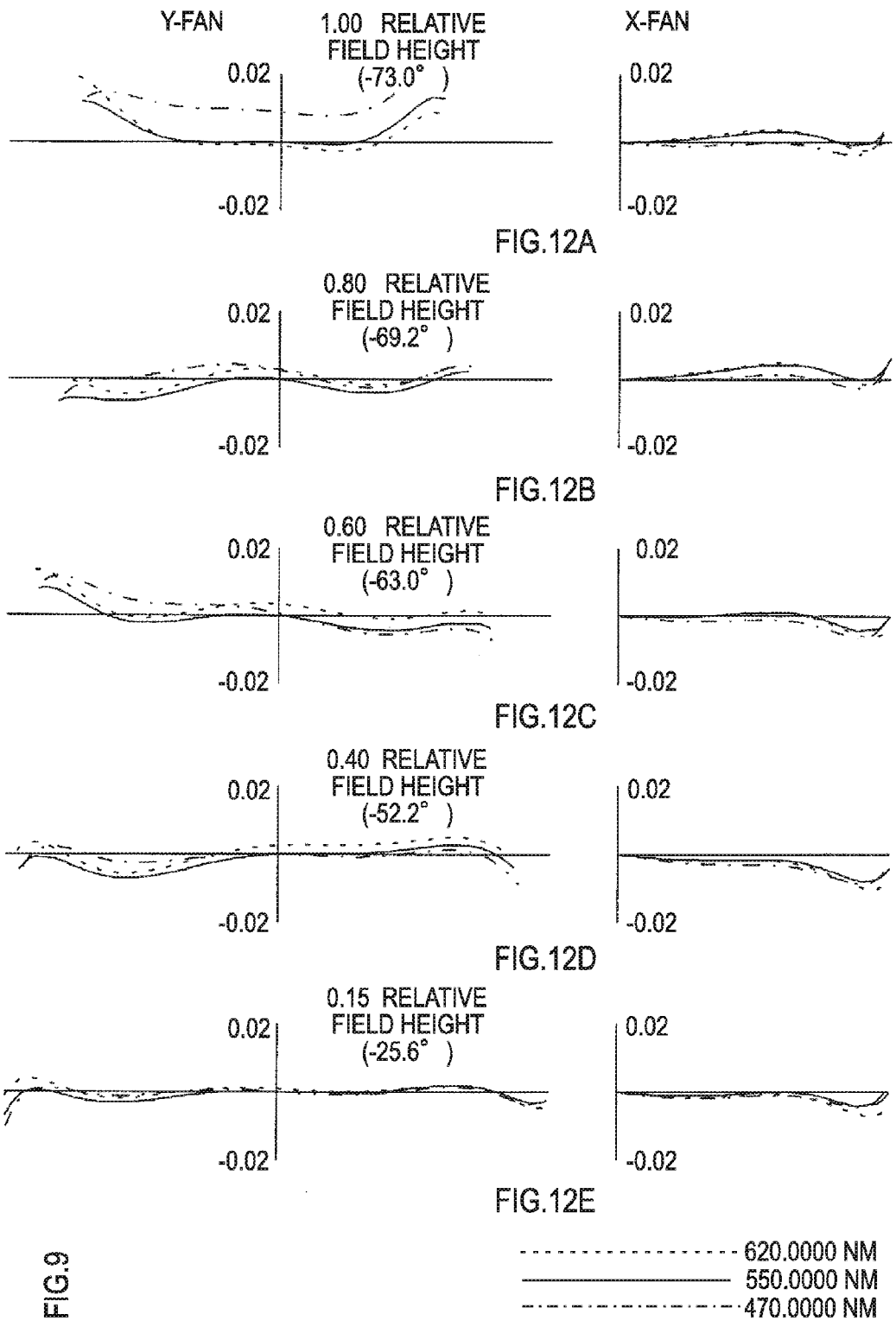

------- 620.0000 NM
——— 550.0000 NM
—·—·— 470.0000 NM

```
---------------- 620.0000 NM
———————————————— 550.0000 NM
—-—-—-—-—-—-—-— 470.0000 NM
```

------------------ 620.0000 NM
———————————— 550.0000 NM
—·—·—·—·—·—·— 470.0000 NM

------------------ 620.0000 NM
—————————— 550.0000 NM
— · — · — · — · — 470.0000 NM

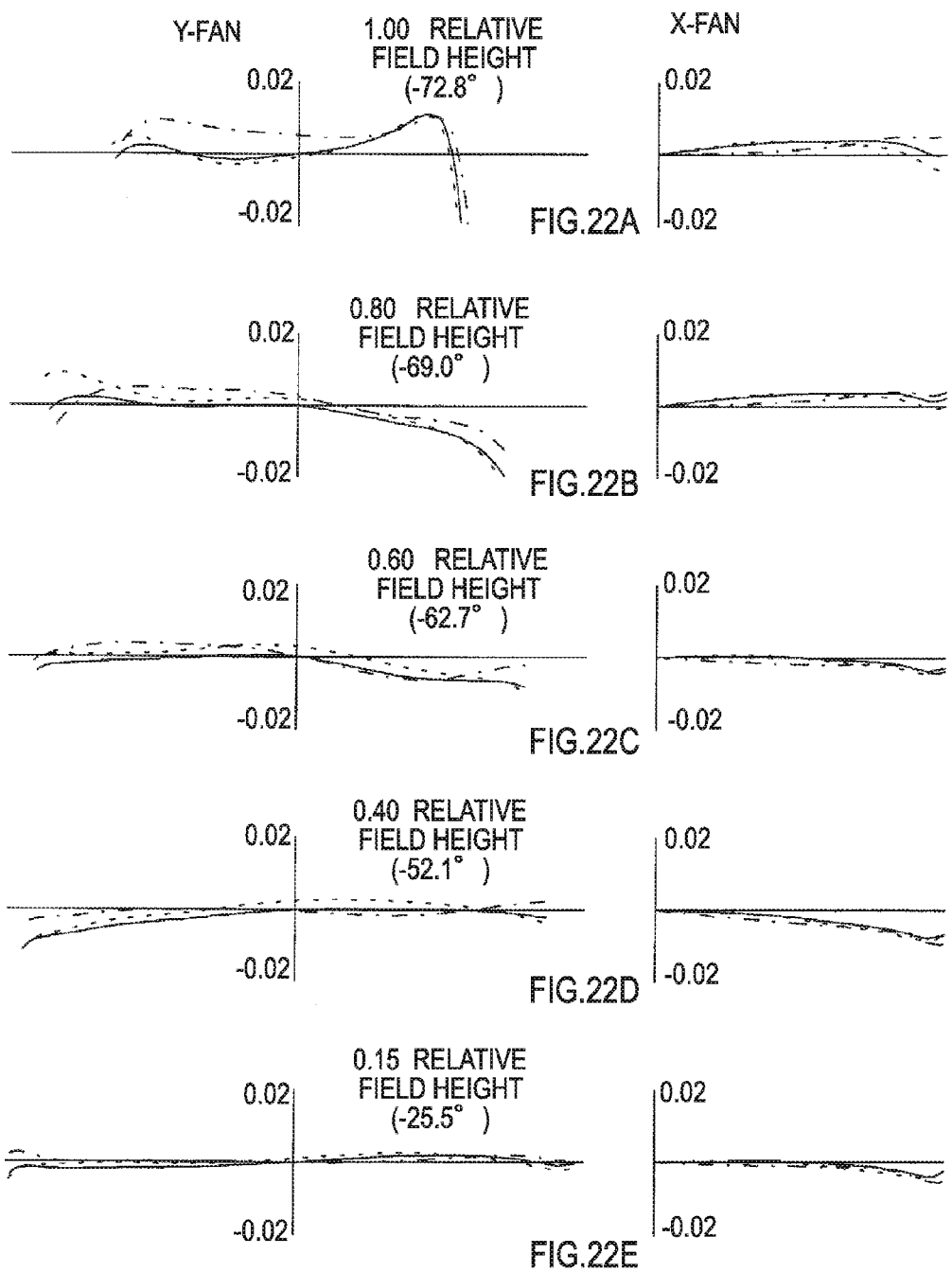

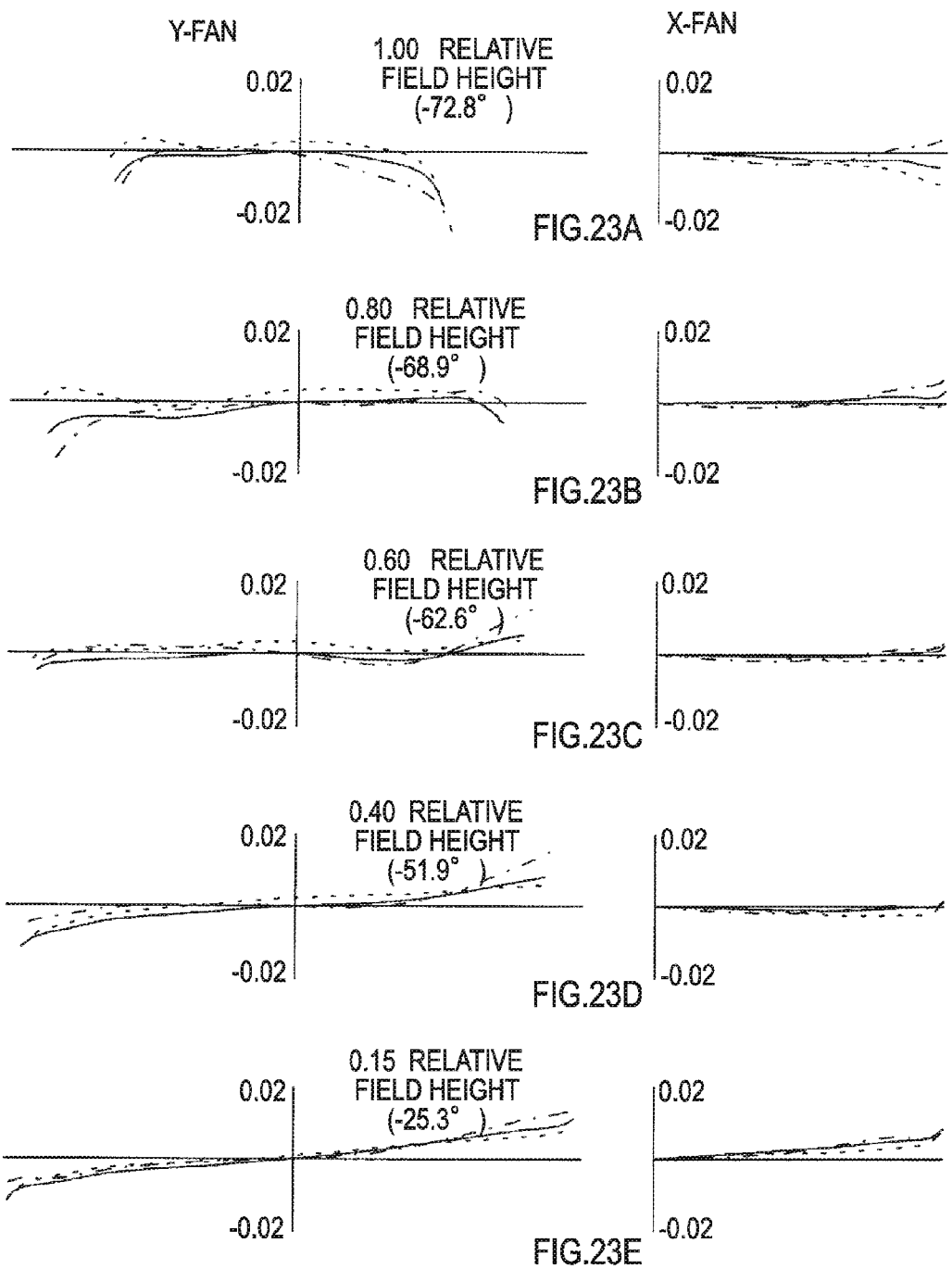

PROJECTION OPTICAL SYSTEM AND PROJECTOR

TECHNICAL FIELD

The present invention relates to a projection optical system suitable for being incorporated into a projector which performs enlargement projection of an image of an image display element, and the projector using the projection optical system.

BACKGROUND ART

In recent years, as a projection optical system for a projector which can perform projection from a short distance so as to obtain a large picture plane, a projection optical system using a refraction optical system and a concave mirror is proposed (see PTLs 1 and 2, or the like).

However, for example, in PTL 1 (JP-A-2006-235516), a significantly wide angle of view is realized using the refraction optical system and the concave mirror, a curved mirror is enormously large in size, and the entire length of the mirror is significantly increased. In addition, in PTL 2 (JP-A-2007-079524), for example, the angle of view is about 60 degrees in an eighth example, and a combination of a concave mirror and a convex mirror allows the mirror size to be decreased. However, similar to PTL 1 described above, the entire length needs to be significantly increased. In addition, the two mirrors in this configuration have aspheric surfaces, respectively, and thus it is highly difficult to manufacture the mirrors in terms of achieving accuracy and assembly.

As described above, in a complex optical system including the refraction optical system and the concave mirror, an ultra-wide angle of view is obtained, but it is difficult to decrease the entire length. Therefore, the complex optical system is not suitable for equipment such as a front projector in which portability is important.

CITATION LIST

Patent Literature

PTL 1: JP-A-2006-235516
PTL 2: JP-A-2007-079524

SUMMARY OF INVENTION

The present invention is made, based on the background described above, and an advantage of some aspects of the invention is to provide a projection optical system which can cover a wide range of magnification changes although being provided with a relatively small number of lenses, and a projector including the projection optical system.

In order to achieve the object described above, the projection optical system according to the present invention includes: in order from a reduction side, a first optical group that is configured of a plurality of lenses and has positive power; and a second optical group that has a reflective surface having a concave aspheric shape. In the projection optical system, the first optical group is configured to have a 1-1st lens group which is fixed when focusing is performed in response to a magnification change and has positive power, and a 1-2nd lens group which, as a whole, has positive power. The 1-2nd lens group includes, in order from the reduction side, three lens groups of an F1 lens group configured of one positive lens, an F2 lens group configured of one positive lens and one negative lens, and an F3 lens group configured of one negative lens, and at least the F2 lens group is caused to move when focusing is performed in response to the magnification change.

In the projection optical system, the 1-2nd lens group is disposed on an enlargement side in the first optical group and needs to have a relatively large lens. In the projection optical system, since it is possible to configure the 1-2nd lens group with a relatively small number of lenses, it is easy to form a compact projection optical system. In addition, at least the F2 lens group is caused to move when focusing is performed in response to the magnification change, thereby making it possible to cover a desirable range of magnification changes.

According to a specific aspect of the present invention, the F3 lens group is configured of a double-sided aspheric lens molded out of a resin. The lens like the F3 lens group, which is disposed on the enlargement side in the first optical group, tends to be large in size. However, the F3 lens group is molded out of the resin, and thereby it is easy to form aspheric surfaces on both sides. In addition, there is a possibility for the F3 lens group to interfere with a beam returning from a reflective mirror constituting the second optical group. Therefore, there is a need to cutout a part of the lens constituting the F3 lens group in some cases; however, resin molding makes it easy to form the lens into a non-circular shape or the like.

According to another aspect of the present invention, the F1 lens group is configured of a positive lens having a convex surface on an enlargement side. The F2 lens group is configured of a positive lens having a convex surface on the reduction side and a negative lens having a concave surface on the reduction side. The F3 lens group is configured of a negative lens having a concave surface on the enlargement side. When the power of each of the lens groups is set to an absolute value of a reciprocal of a focal length of each of the lens groups, the power of the F2 lens group is lower than the power of the F1 lens group and the power of the F3 lens group. In a proximity projection optical system, during the magnification change, a change in a focal position tends to be small in the vicinity of the optical axis and a change in a field curvature tends to be large in a peripheral portion. However, the power of the lens group F2 lens is relatively low, thereby, making it possible to appropriately correct the field curvature or the like, while a focal shift is reduced in the vicinity of the optical axis during the movement.

According to still another aspect of the present invention, the F2 lens group is configured of cemented lenses. In this configuration, for example, in a case where the F2 lens group has a non-circular shape, assembly is easily performed.

According to still another aspect of the present invention, the 1-1st lens group has an aperture within the 1-1st lens group, and has, on the outermost enlargement side, a negative lens that has at least one surface having an aspheric shape. The negative lens and the 1-2nd lens group are combined, thereby, making it possible to appropriately correct field curvature or astigmatism in a wide range of magnification changes while an increase in the number of lenses is regulated.

According to still another aspect of the present invention, the 1-1st lens group has an aperture within the 1-1st lens group, and, as a whole, is configured to have nine or less lenses, including, on the reduction side from the aperture, two positive lenses, first cemented lenses configured of a positive lens and a negative lens, and second cemented lenses configured of a positive lens and a negative lens. It is possible to reduce chromatic aberration by the 1-1st lens group having a relatively small number of constituted lenses. Further, variations occurring during the assembly are reduced. Furthermore, it is possible to increase the numerical aperture.

According to still another aspect of the present invention, the numerical aperture on an object side is equal to or higher than 0.3. In this case, it is possible to form a sufficiently bright projected image.

According to still another aspect of the present invention, the reduction side is substantially telecentric.

According to still another aspect of the present invention, each of a plurality of the lenses and the reflective surface are rotationally symmetric with respect to a common optical axis.

According to still another aspect of the present invention, a range of magnification changes is equal to or greater than 1.5 times.

In order to achieve the object described above, a projector according to the present invention includes: an optical modulator that modulates a beam from a beam source and forms an image beam; and the projection optical system according to any one of the aspects described above that projects the image beam emitted from the optical modulator. The projector includes the projection optical system according to any one of the aspects described above, thereby, making it possible to cover the desired range of magnification changes, while the configuration, in which the number of lenses is decreased, is employed.

BRIEF DESCRIPTION OF DRAWINGS

FIGS. 6(A) to 6(E) are diagrams showing lateral aberration of the projection optical system, which correspond to FIG. 5(A).

FIGS. 8(A) to 8(E) are diagrams showing lateral aberration of the projection optical system, which correspond to FIG. 5(C).

FIGS. 12(A) to 12(E) are diagrams showing lateral aberration of the projection optical system, which correspond to FIG. 10(B).

FIGS. 22(A) to 22(E) are diagrams showing lateral aberration of the projection optical system, which correspond to FIG. 20(B).

FIGS. 23(A) to 23(E) are diagrams showing lateral aberration of the projection optical system, which correspond to FIG. 20(C).

DESCRIPTION OF EMBODIMENTS

Hereinafter, a projection optical system according to an embodiment of the invention will be described in detail with reference to the drawings.

Figure 1:
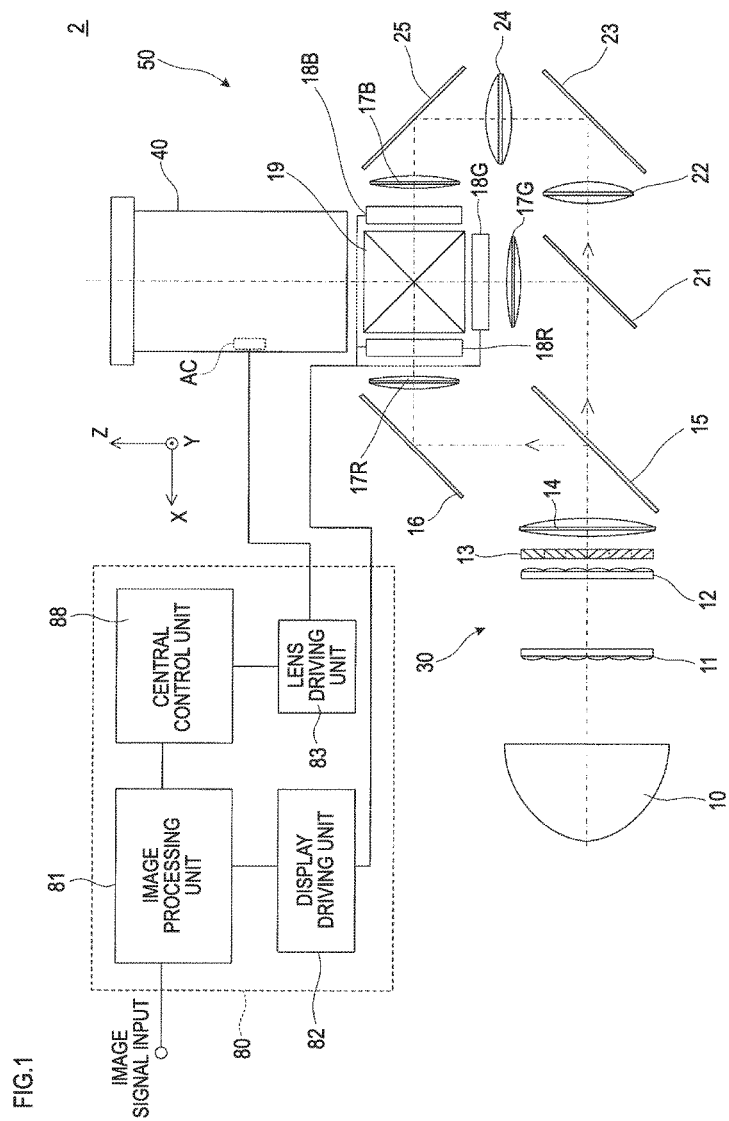
FIG. 1 is a diagram showing a schematic configuration of a projector in which a projection optical system of an embodiment is incorporated.

As illustrated in FIG. 1, a projector 2, in which the projection optical system according to an embodiment of the invention is incorporated, includes an optical system section 50 which projects an image beam, and a circuit device 80 which controls an operation of the optical system section 50.

In the optical system section 50, a beam source 10 is, for example, an extra-high pressure mercury lamp, and emits beams including an R beam, a G beam, and a B beam. The beam source 10 may be a discharge beam source, in addition to an extra-high pressure mercury lamp, or may be a solid-state beam source, such as an LED or a laser. A first integrator lens 11 and a second integrator lens 12 have a plurality of lens elements arranged in an array. The first integrator lens 11 divides a beam from the beam source 10 into a plurality of beams. Each lens element of the first integrator lens 11 condenses the beam from the beam source 10 in the vicinity of the lens elements of the second integrator lens 12. The lens elements of the second integrator lens 12 form images of the lens elements of the first integrator lens 11 on the liquid crystal panels 18R, 18G, and 18B in cooperation with a superimposing lens 14. In this configuration, the entire display regions of the liquid crystal panels 18R, 18G, and 18B are illuminated with a beam from the beam source 10, in substantially uniform brightness.

A polarization conversion element 13 converts a beam from the second integrator lens 12 to a predetermined linearly polarized beam. The superimposing lens 14 superimposes the image of each lens element of the first integrator lens 11 on the display regions of the liquid crystal panels 18R, 18G, and 18B through the second integrator lens 12.

A first dichroic mirror 15 reflects the R beam incident from the superimposing lens 14 and transmits the G beam and the B beam. The R beam reflected from the first dichroic mirror 15 is incident to the liquid crystal panel 18R serving as an optical modulator through a reflective mirror 16 and a field lens 17R. The liquid crystal panel 18R modulates the R beam in response to an image signal so as to form an R-color image.

A second dichroic mirror 21 reflects the G beam from the first dichroic mirror 15 and transmits the B beam. The G beam reflected from the second dichroic mirror 21 is incident to the liquid crystal panel 18G serving as an optical modulator through a field lens 17G. The liquid crystal panel 18G modulates the G beam in response to an image signal to form a G-color image. The B beam transmitted through the second dichroic mirror 21 is incident to the liquid crystal panel 18B serving as an optical modulator through relay lenses 22 and 24, reflective mirrors 23 and 25, and a field lens 17B. The liquid crystal panel 18B modulates the B beam in response to an image signal to form a B-color image.

Across dichroic prism 19 is a prism for beam composition, combines beams modulated by the liquid crystal panels 18R, 18G, and 18B to form an image beam, and causes the image beam to travel to a projection optical system 40.

The projection optical system 40 is a zoom lens for projection, which projects, onto a screen (not shown) on an enlarged scale, an image beam that is modulated by the liquid crystal panels 18G, 18R, and 18B and that is combined by the cross dichroic prism 19.

The circuit device 80 includes an image processing unit 81 to which an external image signal, such as a video signal, is input, a display driving unit 82 which drives the liquid crystal panels 18G, 18R, and 18B provided in the optical system section 50 on the basis of an output of the image processing unit 81, a lens driving unit 83 which operates a driving mechanism (not shown) provided in the projection optical system 40 to adjust a state of the projection optical system 40, and a central control unit 88 which performs overall control of the operations of the circuit portions 81, 82, and 83, and the like.

The image processing unit 81 converts the input external image signal to an image signal including the tone of each color or the like. The image processing unit 81 may perform various image processes, such as distortion correction or color correction, on the external image signal.

The display driving unit 82 can operate the liquid crystal panels 18G, 18R, and 18B on the basis of an image signal output from the image processing unit 81, and can form an image corresponding to the image signal or an image corresponding to an image signal subjected to the image process, on the liquid crystal panels 18G, 18R, and 18B.

The lens driving unit 83 operates under the control of the central control unit 88, and appropriately moves some optical components configuring the projection optical system 40 along an optical axis OA through an actuator AC, thereby it is possible to perform focusing in response to a magnification change (focusing during a magnification change) in projection of an image on a screen by the projection optical system 40. Further, the lens driving unit 83 can change a vertical position of the image projected on the screen, through adjustment of a tilt at which the entire projection optical system 40 moves vertically perpendicular to the optical axis OA.

Figure 2:
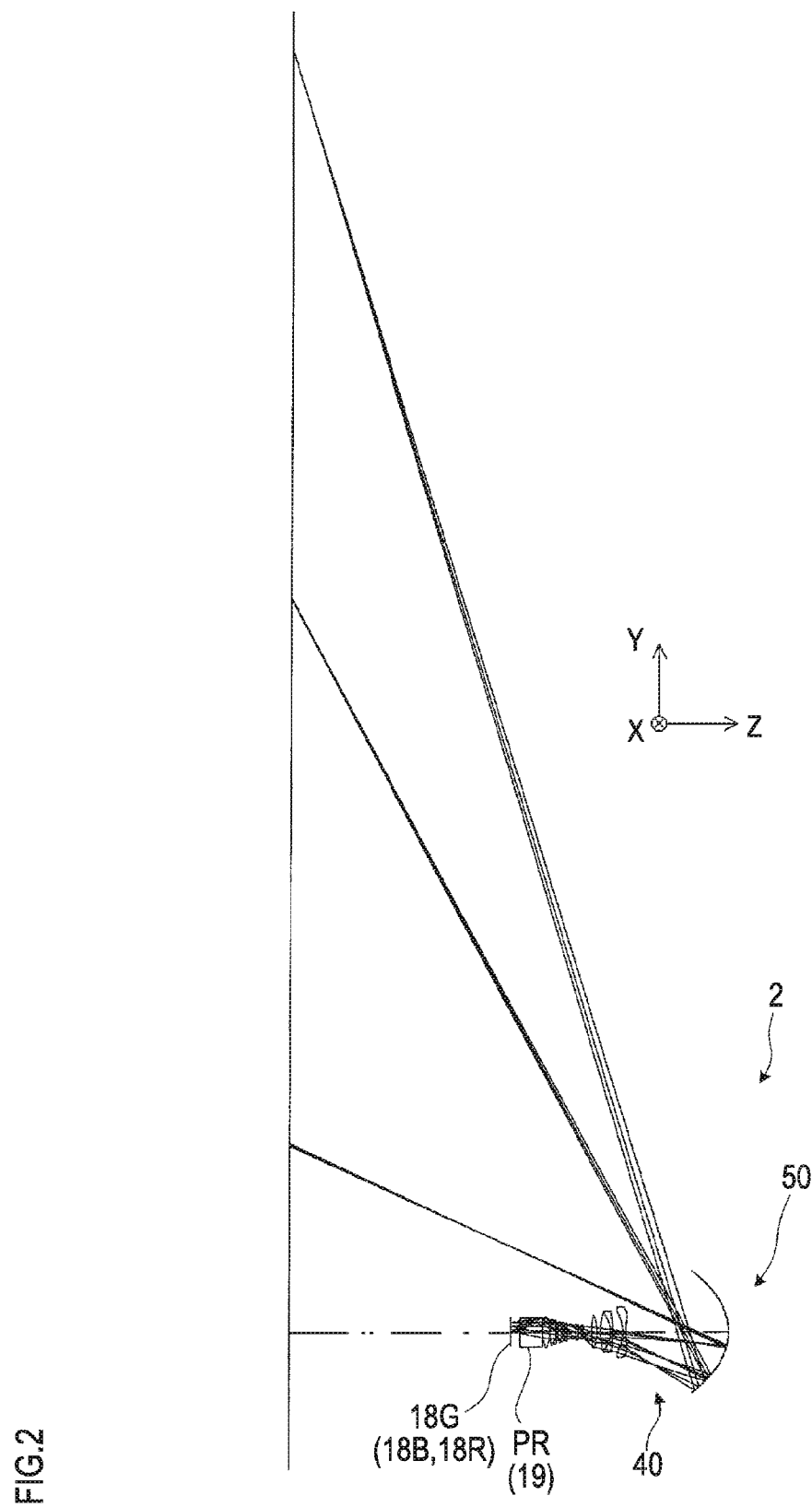
FIG. 2 is a diagram showing beams and a configuration from an object surface to a projection surface in the projection optical system of the embodiment or Example 1.
Figure 3:
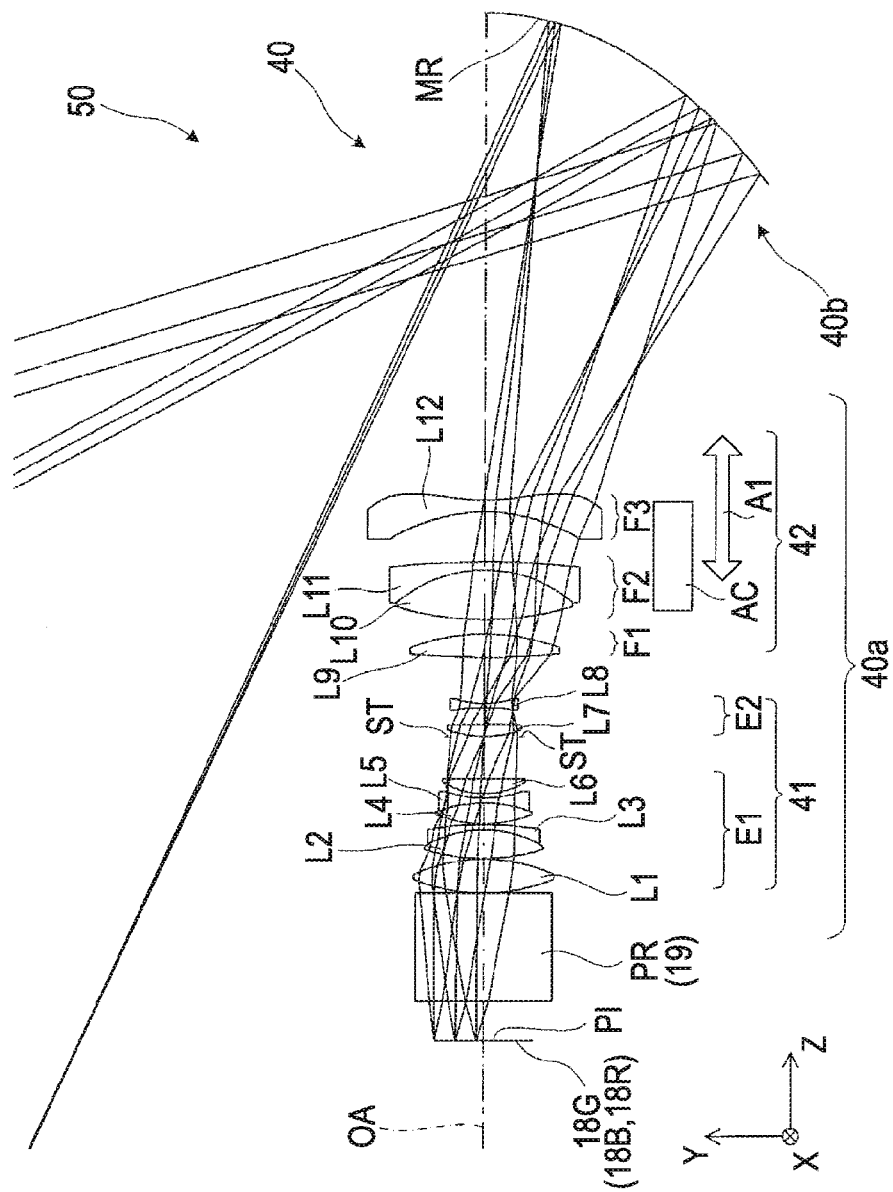
FIG. 3 is an enlarged diagram showing a part from the object surface to a concave reflective mirror in FIG. 2.

Hereinafter, the projection optical system 40 of the embodiment will be specifically described with reference to FIG. 2 and FIG. 3. The projection optical system 40 illustrated in FIG. 2 or the like has the same configuration as the projection optical system 40 of Example 1 to be described below.

The projection optical system 40 of the embodiment projects an image formed on the liquid crystal panel 18G (18R or 18B), onto a screen (not shown). A prism PR corresponding to the cross dichroic prism 19 in FIG. 1 is disposed between the plane of projection optical system 40 and the liquid crystal panel 18G (18R or 18B).

The projection optical system. 40 includes, in order from a reduction side, a first optical group 40a that is configured of a plurality of lenses and has positive power and a second optical group 40b that is configured of a mirror MR with a reflective surface having a concave aspheric shape. The first optical group 40a is configured to have a 1-1st lens group 41 that is provided on the reduction side and has positive power and a 1-2nd lens group 42 that is provided on an enlargement side and has positive power lower than the power of the 1-1st lens group 41.

The 1-1st lens group 41 has an aperture ST within the 1-1st lens group 41 and is configured to have a lens group E1 on the reduction side from the aperture ST and a lens group E2 on the enlargement side from the aperture ST.

The 1-2nd lens group 42 has, in order from the reduction side, an F1 lens group (hereinafter, lens group F1), an F2 lens group (hereinafter, lens group F2), and an F3 lens group (hereinafter, lens group F3). The lens group F1, the lens group F2, and the lens group F3, respectively move in the optical axis direction when focusing is performed in response to the magnification change. The lens group F1 positioned on the outermost reduction side of the lens groups F1 to F3 is configured to have one positive lens L9. The lens group F2 positioned between the lens group F1 and the lens group F3 is configured to have one positive lens L10 and one negative lens L11. The lens group F3 lens positioned on the outermost enlargement side is configured to have one negative lens having aspheric surface on both sides. The lens group F3 is molded out of a resin. At least the lens group F2 of the three lens groups F1 to F3 is caused to move by an actuator AC in a direction A1 along the optical axis OA when focusing is performed during the magnification change. Here, it is possible for all of the lens groups F1 to F3 to respectively move separately from each other in the direction A1 along the optical axis OA. Note that, as the movement of the lens groups F1 to F3 by the actuator AC, it is possible to employ various types of movement depending on the focusing during the magnification change. For example, the lens groups F1 lens to F3 lens may be caused to move completely in the separate manner or may be caused to move in an interlinked manner with each other using a cam mechanism or the like.

Hereinafter, the lenses constituting each lens group will be described in order from the reduction side. The lens group E1 has lenses L1 to L6 and the lens group E2 has lenses L7 and L8. The lens group F1 lens has the lens L9, the lens group F2 lens has lenses L10 and L11, and the lens group F3 lens has a lens L12. In other words, the first optical group 40a as a whole is configured to have 12 lenses.

Each of the lenses L1, L2, L4, and L6 is the positive lens, and each of the lenses L3 and L5 is a negative lens. The lens L2 and the lens L3 form cemented lenses, and the lens L4 and the lens L5 form cemented lenses. The 1-1st lens group 41 has at least two sets of cemented lenses of the positive lenses and the negative lenses on the reduction side from the aperture ST. In addition, each of the lenses L1 to L6 is a spherical glass lens and has a circular shape which is symmetric about the optical axis OA.

The lens L7 is the positive lens and the lens L8 is the negative lens. Note that the lenses L7 and L8 are spherical glass lenses and have a circular shape which is symmetric about the optical axis OA.

As described above, the 1-1st lens group 41 as a whole is configured to have eight lenses, that is, nine lenses or less (lenses L1 to L8). The projection optical system 40 according to the embodiment includes a relatively small number of lenses such that it is possible to reduce chromatic aberration. In addition, since the projection optical system 40 includes cemented lenses, variations occurring during the assembly are reduced. Further, it is possible to increase the numerical aperture.

The lens L9 is the positive lens (biconvex positive lens in an example in the figures) having at least a convex surface on the enlargement side. Note that the lens L9 is a spherical glass lens and has a circular shape which is symmetric about the optical axis OA.

The lens L10 is the positive lens (biconvex positive lens in an example in the figures) having a convex surface on the reduction side, and the lens L11 is the negative lens (negative meniscus lens in an example in the figures) having a concave surface on the reduction side. In the example in the figures, the lenses L10 and L11 are configured of the cemented lenses. In other words, the lens group F2 lens is configured of the cemented lenses. Note that the lenses L10 and L11 are spherical glass lenses and have a circular shape which is symmetric about the optical axis OA.

As described above, the lens L12 is a double-sided aspheric lens having negative power and is molded out of a resin. Note that the lens L12 may have a circular shape which is symmetric about the optical axis OA or may have an aspheric shape. For example, the lens L12 may have a shape in which a part of the circular shape which is symmetric about the optical axis OA is cutout on an upper side thereof (side onto which an image beam is projected).

As described above, the second optical group 40b is configured of a mirror MR having a concave aspheric shape. The mirror MR reflects, toward a screen, the image beam emitted from the first optical group 40a.

Note that, as described above, each of the lenses L1 to L12 constituting the first optical group 40a has a circular shape which is symmetric about the optical axis OA or at least the lens L12 has the shape in which apart of the circular shape which is symmetric about the optical axis OA is cutout. In addition, the mirror MR constituting the second optical group 40b also has a shape in which a part of a shape which is symmetric about the optical axis OA is cutout. In other words, each of the lenses L1 to L12, and a reflective surface of the mirror MR are rotationally symmetric with respect to a common optical axis. In addition, as shown in the figures, the reduction side in the projection optical system 40 is substantially telecentric. For example, as described above, in a case where beams modulated by the respective liquid crystal panels 18R, 18G, and 18B in the cross dichroic prism 19 are synthesized into an image beam, it is possible to easily absorb variations occurring during assembly. In a case where a projection position to the screen is closer to the screen in the direction of the optical axis OA, not only the lens group F3 lens (lens L12), but also the lens group F2 lens (lenses L10 and L11) have the non-circular shape in some cases. In this case, the lens group F2 lens has the cemented lenses, thereby making it possible to achieve simple structure of a frame, and to achieve improvement in accuracy during the assembly.

In general, in a proximity projection optical system, a distance to a screen is very short. In the projection optical system 40, an image formed on a panel surface PI of the liquid crystal panel 18G (18R or 18B) is temporarily formed as an image in front of a mirror of the second optical group 40b by the first optical group 40a, is again formed as an image on a screen by the second optical group 40b, and thereby proximity projection is performed. In other words, the first optical group 40a forms a primary image (intermediate image) in front of the mirror MR. In the projection method as described above, since aberration fluctuation due to focusing during the magnification change is relatively large, it is possible not to have a large range of the magnification changes. Accordingly, it is preferable that the primary image formed by the first optical group 40a needs to be optimized so as to finally obtain a good image, even in a case where projection magnification is changed. In addition, in a common proximity projection optical system, contrast reduction is increased due to the field curvature and astigmatism fluctuation. In addition, in the proximity projection optical system, a change in distortion due to the movement of the focus group tends to be increased more than in the normal lens system.

However, since the projection optical system 40 of the embodiment includes a configuration in which the lens groups F1 lens to F3 lens are caused to move when focusing is performed in response to the magnification change, as described above, it is possible to reduce the change in aberration. To be more specific, first, the lens group F1 lens configured of the positive lens efficiently guides, to the lens group F2 lens, the beam emitted as a divergent beam from the 1-1st lens group 41. In addition, the lens group F2 lens having lower power than the lens group F1 lens and the lens group F3 lens moves most during focusing, and thereby the field curvature, astigmatism, and distortion are reduced such that a good primary image is formed. Further, the lens group F3 lens having the negative power and having the aspheric shape performs final correction of aberration, in cooperation with the second optical group 40b configured of the mirror MR having the concave aspheric shape. Since the lens group F3 lens in the first optical group 40a, which is disposed immediately before the second optical group 40b, is aspheric lens, it is possible to effectively perform optimal correction of each field height. As described above, even in a case where the 1-1st lens group 41 is configured of small number of lenses (configured of eight lenses in a case in the figure), and the second optical group 40b is configured of one mirror MR, the 1-2nd lens group 42 is configured of the four lenses (the positive lens L9, the positive lens L10, the negative lens L11, and the negative lens L12), thereby making it possible to contain appropriate aberration in the primary image and making it possible to reduce the aberration in the image that is projected on the screen through the second optical group 40b. In other words, the projector 2 as a proximity type projector can cover a wide range of the magnification changes and can also correspond to an image display element having high resolution.

In addition, in the proximity projection optical system, the focal distance of the entire lens system is very short. Thus, if a projection distance is changed during the magnification change, a change in a focal position is small in the vicinity of the optical axis and a change in the field curvature is significantly increased in a peripheral portion. However, in the embodiment or the example, since the power of the lens group F2 lens for correction of the field curvature or the like is relatively lower than the power of the lens group F1 lens and the power of the lens group F3 lens, a shift of a focal point is reduced in the vicinity of the optical axis when the lens group F2 lens is caused to move such that the field curvature or the like is appropriately corrected. Note that, in a case where the power of the lens group F2 lens is high, there is a possibility that it is possible to decrease an amount of movement; however, the lens group F2 lens supplements the correction by the other lens groups F1 lens and F3 lens , and, for example, the lens groups F1 lens to F3 lens need to move with higher accuracy.

In addition, the lens group F2 lens corrects a change or distortion in the image plane occurring in response to the magnification change in an appropriate manner, and can maintain an angle of a light beam incident to the lens group F3 lens in an appropriate range. As described above, in the case where the lens group F3 lens is configured of the resin lens, an error or the like in a refractive index of a lens due to an error or internal distortion in a surface shape is likely to influence the lens group F3 lens . Therefore, an incident angle of the light beam incident to the lens group F3 lens , with respect to the lens surface of the lens group F3 lens may be small. Thus, in order from the reduction side, the lens group F2 lens , in which the lens having the positive power and the lens having the negative power are disposed, is disposed in the previous stage of the lens group F3 lens , and thereby the light beam emitted from the lens group F2 lens is incident to the lens group F3 lens at the smallest incident angle such that it is possible to reduce the influence described above on the lens group F3 lens .

Further, in the projection optical system 40, the lens group E1 as a whole on the reduction side from the aperture ST is configured to have spherical lenses, and the 1-1st lens group 41 is configured to have a relatively small number of lenses, that is, less than nine lenses. However, the numerical aperture on the object side is secured to be 0.27 or higher, that is, the brightness having F-number of about 1.8 and a range of large magnification changes of 1.5 times or higher (further, 1.6 times or higher) are secured, such that the projection optical system 40 can also sufficiently correspond to the image display element having high resolution. Note that, as will be described below in Examples 3 and 4, a glass aspheric surface is appropriately disposed on the reduction side (lens group E1) from the aperture ST, thereby making it possible to obtain an image having high contrast with small flare while brightness is obtained with the numerical aperture of 0.3 or higher, that is, F-number of about 1.6. In addition, the number of the constituted lenses is decreased, thereby making it possible to decrease the entire length of the lenses.

In addition, in a case where the field height needs to be more lowered, there is a possibility that the lens group F2 lens also needs to have a non-circular shape having a part which is cutout, similar to the aspheric lens constituting the lens group F3 lens as described above. In this case, it is preferable that the lens group F2 lens is configured of the cemented lenses as described above.

The 1-1st lens group 41 has at least two lenses (L7 and L8) on the enlargement side from the aperture ST, and the lens L8 on the outermost enlargement side is the negative lens that has at least one surface having the aspheric shape. Note that, in the example, the lens L8 has both surfaces having the aspheric shape. In this manner, the aspheric lens of the 1-2nd lens group 42 is configured of only one lens L12, and good characteristics are maintained even in the wide range of magnification changes.

The 1-1st lens group 41 efficiently obtains a beam emitted from an object, that is, the panel surface PI (reduction side) and sends the beam to the focus lens group configured of the 1-2nd lens group 42. At least two lenses (lenses L7 and L8) are disposed on the enlargement side from the aperture ST in the 1-1st lens group 41 such that the 1-2nd lens group 42 forms an appropriate intermediate image in the wide range of the magnification changes, thereby making it possible to obtain a good image. Further, in the 1-2nd lens group 42, in order to easily perform the correction of the aberration in the wide range of the magnification changes even when only the lens L12 is the aspheric lens as described above, it is preferable that a lens that has at least one surface subjected to having aspheric surface is disposed in the lens on the enlargement side from the aperture ST in the 1-1st lens group 41. In this manner, without increasing the number of the lenses of the 1-1st lens group 41, the 1-1st lens group 41 is combined with the 1-2nd lens group 42 functioning as the focus lens group, thereby making it possible to appropriately correct the field curvature, and the astigmatism in the wide range of the magnification changes such that it is possible to obtain stable characteristics.

EXAMPLE

Hereinafter, a specific example of the projection optical system 40 will be described. Meanings of specifications common in Examples 1 to 4 in the following description are defined as follows.

f Focal Length of Entire system
ω Half Angle of View
NA Numerical Aperture
R Curvature Radius
D Surface Interval on Axis (Lens Thickness or Lens Interval)
Nd Refractive Index of d Line
Vd Abbe Number of d Line The aspheric surface is defined by the following polynomial equation (aspheric surface equation).

$$z = \frac{ch^2}{1 + \sqrt{1 - (k+1)c^2h^2}} + A_4h^4 + A_6h^6 + A_8h^8 + A_{10}h^{10} + A_{12}h^{12} + A_{14}h^{14}$$

Here,
c: Curvature (1/R)
h: Height from Optical Axis
k: Coefficient of the Cone of Aspheric Surface
Ai: Coefficient of Aspheric Surface in High Order Equation Note that OBJ means the panel surface PI, STO means the aperture ST, and IMG means an image plane (projected plane) on the screen. In addition, a surface, to which "*" is attached after a surface reference number, means a surface having the aspheric shape.

Example 1

Data of lens surfaces of Example 1 is shown in the following Table 1.

TABLE 1

| | f 3.709 | | | |
| | ω 73.0° | | | |
| | NA 0.278 | | | |
| | R | D | Nd | Vd |
| OBJ | Infinity | 9.500 | | |
| 1 | Infinity | 25.970 | 1.51633 | 64.14 |
| 2 | Infinity | 0.000 | | |
| 3 | 43.564 | 8.200 | 1.61800 | 63.33 |

TABLE 1-continued f 3.709
ω 73.0°
NA 0.278

|  | R | D | Nd | Vd |
|---|---|---|---|---|
| 4 | −40.412 | 0.200 | | |
| 5 | 46.11 | 7.000 | 1.49700 | 81.54 |
| 6 | −26.518 | 1.200 | 1.90366 | 31.31 |
| 7 | −81.382 | 0.200 | | |
| 8 | 29.954 | 5.000 | 1.48749 | 70.24 |
| 9 | −32.009 | 1.200 | 1.90366 | 31.31 |
| 10 | 26.176 | 1.071 | | |
| 11 | 19.093 | 3.600 | 1.53172 | 48.84 |
| 12 | −845.915 | 10.000 | | |
| STO | Infinity | 0.100 | | |
| 14 | 25.212 | 3.000 | 1.84666 | 23.78 |
| 15 | −334.286 | 3.844 | | |
| *16 | −74.924 | 1.200 | 1.83220 | 40.10 |
| *17 | 21.528 | Variable Interval | | |
| 18 | 196.447 | 5.600 | 1.85478 | 24.80 |
| 19 | −50.587 | Variable Interval | | |
| 20 | 72.126 | 12.000 | 1.48749 | 70.24 |
| 21 | −32.404 | 2.000 | 1.84666 | 23.78 |
| 22 | −216.256 | Variable Interval | | |
| *23 | −37.853 | 2.800 | 1.53116 | 56.04 |
| *24 | 44.599 | Variable Interval | | |
| *25 | −58.263 | Variable Interval | | |
| IMG | Infinity | | | |

In the above Table 1 and the following Tables, an exponent of 10 (for example, $1.00 \times 10^{+18}$) is described using E (for example, 1.00E+18).

The following Table 2 shows aspheric coefficients of the lens surfaces of Example 1.

TABLE 2

Aspheric Coefficient

| | K | A04<br>A12 | A06<br>A14 | A08 | A10 |
|---|---|---|---|---|---|
| 16 | −1.0000 | −4.6894E−05<br>0.0000E+00 | −2.7330E−07<br>0.0000E+00 | 1.6516E−09 | 0.0000E+00 |
| 17 | −0.2030 | −1.3556E−05<br>0.0000E+00 | −3.5274E−07<br>0.0000E+00 | 3.1715E−09 | −1.1549E−11 |
| 23 | −9.0272 | −1.1037E−05<br>3.0516E−18 | 1.3936E−08<br>0.0000E+00 | 2.4229E−12 | −3.3407E−14 |
| 24 | 0.0000 | −3.0151E−05<br>−4.0833E−17 | 3.9325E−08<br>1.1283E−20 | −5.9215E−11 | 5.8291E−14 |
| 25 | −0.9579 | 5.9066E−08<br>−2.2285E−21 | 3.3754E−11<br>1.3575E−25 | −4.3046E−14 | 1.4013E−17 |

The following Table 3 shows values of variable intervals 17, 19, 22, 24, and 25 in Table 1 at the projection magnification of 125 times, the projection magnification of 100 times, and the projection magnification of 169 times.

TABLE 3

Variable Interval

| | 125x | 100x | 169x |
|---|---|---|---|
| 17 | 11.1011 | 11.0121 | 11.3007 |
| 19 | 3.4586 | 1.5000 | 5.4505 |
| 22 | 12.0625 | 13.8356 | 10.1774 |
| 24 | 117.6929 | 117.9674 | 117.3866 |
| 25 | −501.0000 | −408.8256 | −666.7629 |

Figure 4:
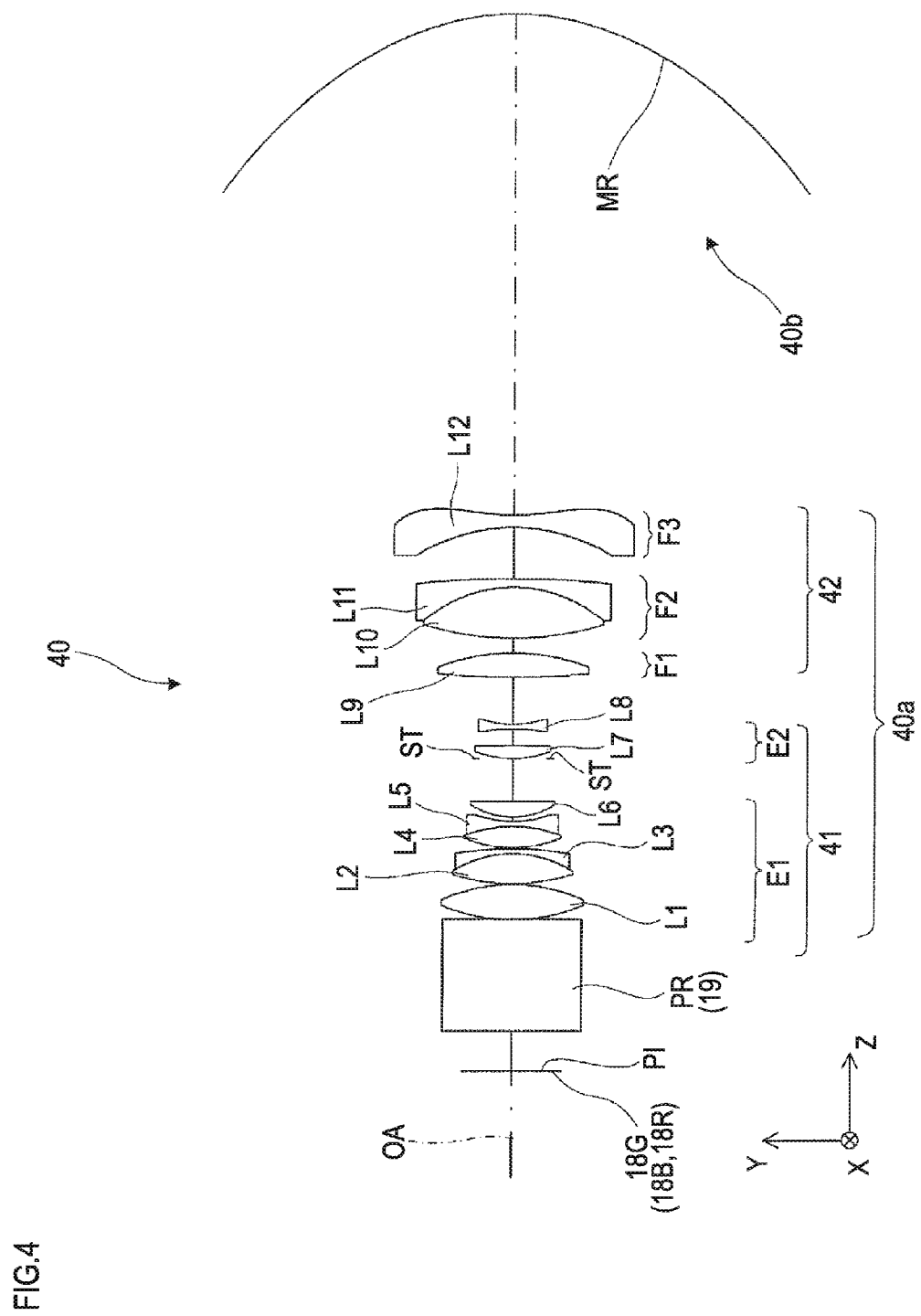
FIG. 4 is a diagram showing a configuration of the projection optical system of Example 1.

FIG. 4 is a sectional diagram showing the projection optical system of Example 1. The projection optical system in FIG. 4 corresponds to the projection optical system 40 of Embodiment 1. In FIG. 4, the projection optical system 40 performs enlargement projection of an image on the panel surface PI at a magnification depending on a distance to the screen. The projection optical system 40 has twelve lenses L1 to L12 of the lenses L1 to L6 constituting the lens group E1 and the lenses L7 and L8 constituting the lens group E2 of the 1-1st lens group 41, the lens L9 constituting the lens group F1 lens, the lenses L10 and L11 constituting the lens group F2 lens, and the lens L12 constituting the lens group F3 lens of the 1-2nd lens group 42, in this order from the reduction side. For example, as in a case where projection onto a wall surface is changed to projection onto a floor surface, the magnification change is performed by the change of a projection position (change of projection distance). When focusing is performed in response to the magnification change, the 1-1st lens group 41 is fixed as is, whereas the lens groups F1 lens to F3 lens individually move. In other words, the 1-2nd lens group 42 performs focusing by causing the three lens groups F1 lens, F2 lens, and F3 lens to individually move during the magnification change. In this case, it is found from the values in Table 3 that, in the focusing in response to the magnification change, the lens group F2 lens (F2 lens group) of the lens groups F1 lens to F3 lens has the relatively largest amount of movement.

The respective lenses L1 to L12 will be described in detail. The lens L1 as a first lens is a positive lens having a biconvex shape, the lens L2 as a second lens is a positive lens having a biconvex shape, the lens L3 as a third lens is a negative meniscus lens having a concave surface on the reduction side, the second lens and the third lens form the cemented lenses, the lens L4 as a fourth lens is a positive lens having a biconvex shape, the lens L5 as a fifth lens is a negative lens having a biconcave shape, the fourth lens and the fifth lens form the cemented lenses, the lens L6 as a sixth lens is a positive lens having a biconvex shape, the lens L7, as a seventh lens, which is positioned in the rear stage of the aperture ST is a positive lens having a biconvex shape, and the lens L8 as an eighth lens is a negative lens having a biconcave shape with aspheric surfaces on both sides. The lens L9 as a ninth lens is a positive lens having a biconvex shape, the lens L10 as a tenth lens is a positive lens having a biconvex shape, the lens L11 as an eleventh lens is a negative meniscus lens having a concave surface on the reduction side, the tenth lens and the eleventh lens form the cemented lenses, and the lens L12 as a twelfth lens is a double-sided aspheric lens having negative power. The lens L12 has a biconcave shape in the vicinity of the optical axis. The lens L12 is a lens molded out of a resin. In addition, the second optical group 40b is configured of one concave aspheric mirror.

Figure 5A:
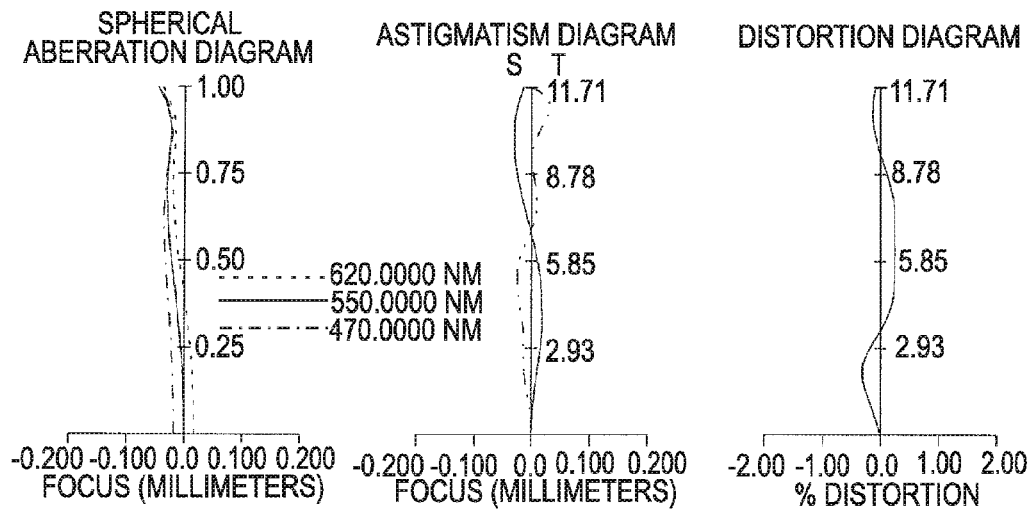
FIGS. 5(A) to 5(C) are diagrams showing aberration on a reduction side of the projection optical system of Example 1.
Figure 5B:
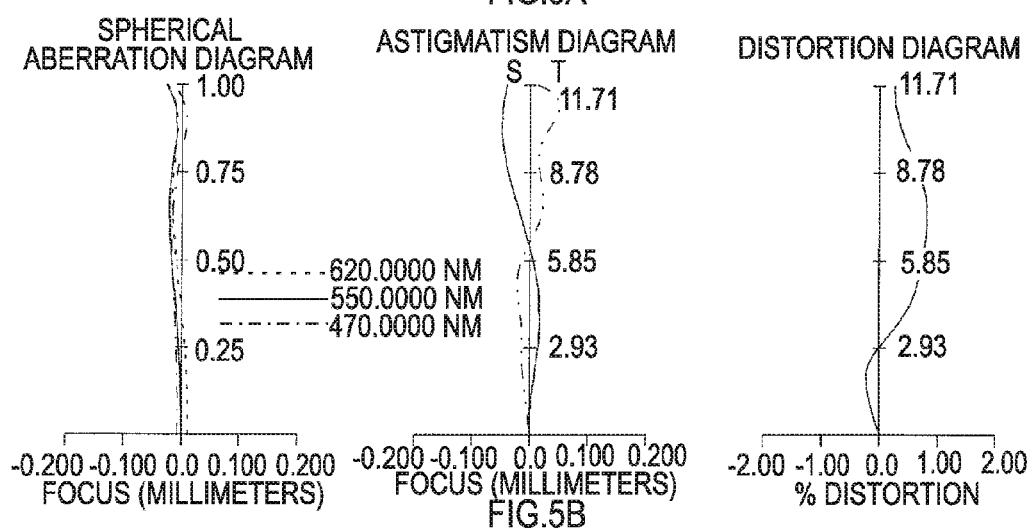
Figure 5C:
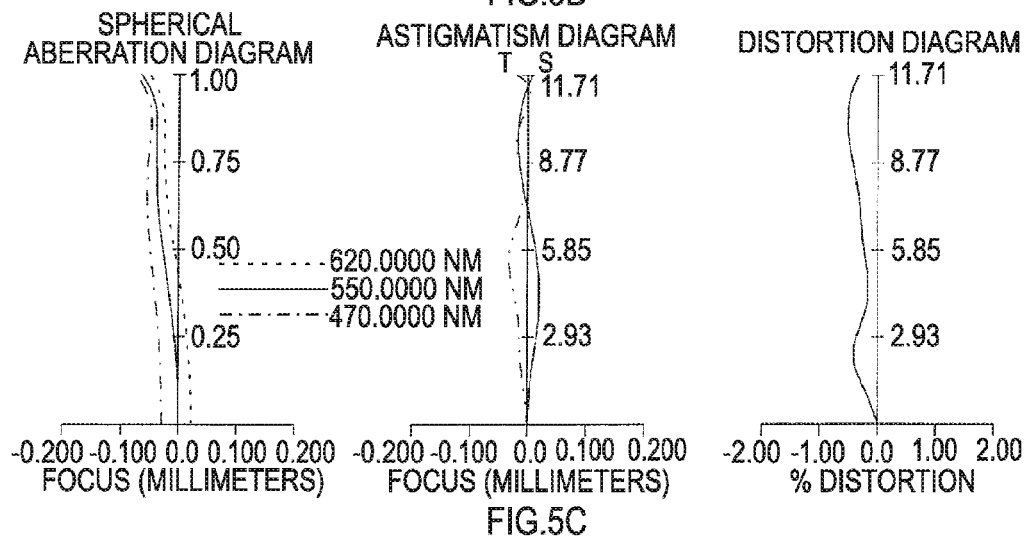
Figure 7A:
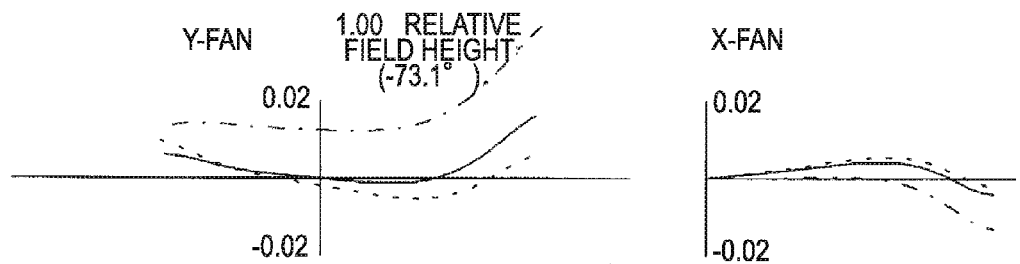
FIGS. 7(A) to 7(E) are diagrams showing lateral aberration of the projection optical system, which correspond to FIG. 5(B).
Figure 7B:
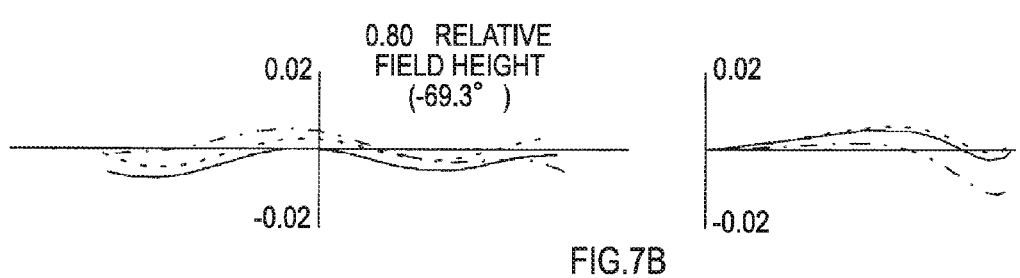
Figure 7C:
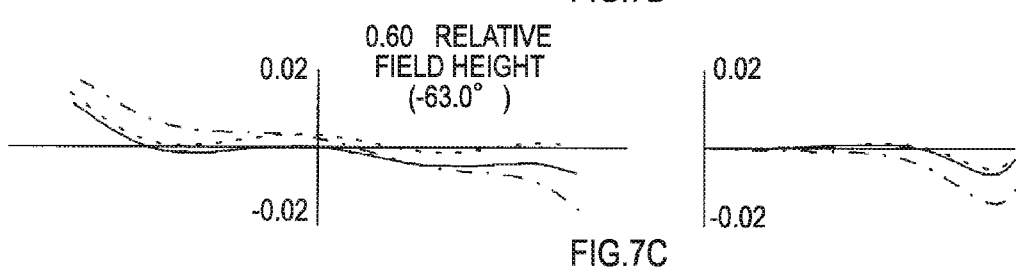
Figure 7D:
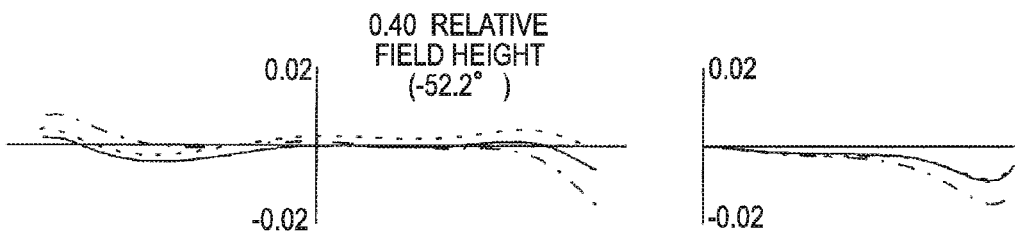
Figure 7E:
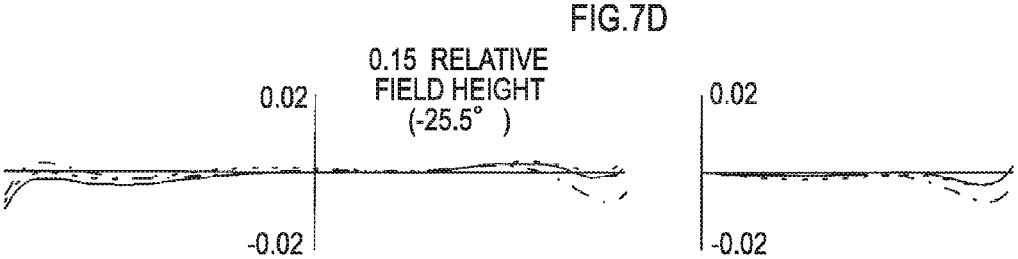

FIG. 5(A) is a diagram showing aberration (spherical aberration, astigmatism, and distortion) on the reduction side of the projection optical system at the projection magnification of 125 times. FIG. 5(B) is a diagram showing aberration on the reduction side of the projection optical system at the projection magnification of 100 times. FIG. 5(C) is a diagram showing aberration on the reduction side of the projection optical system at the projection magnification of 169 times. In addition, FIGS. 6(A) to 6(E) are diagrams showing lateral aberration of the projection optical system, which correspond to FIG. 5(A). FIGS. 6(A) to 6(E) show lateral aberration in the field height of 100%, 80%, 60%, 40%, and 15%, respectively. FIG. 6(A) corresponds to a case of the maximum angle of view. Similarly, FIGS. 7(A) to 7(E) are diagrams showing lateral aberration of the projection optical system, which correspond to FIG. 5(B) and FIGS. 8(A) to 8(E) are diagrams showing lateral aberration of the projection optical system, which correspond to FIG. 5(C).

Example 2

Data of lens surfaces of Example 2 is shown in the following Table 4.

TABLE 4 f 3.700
ω 72.9°
NA 0.278

| | R | D | Nd | Vd |
|---|---|---|---|---|
| OBJ | Infinity | 9.500 | | |
| 1 | Infinity | 25.970 | 1.51633 | 64.14 |
| 2 | Infinity | 0.000 | | |
| 3 | 39.579 | 8.000 | 1.61800 | 63.33 |
| 4 | −43.561 | 0.200 | | |
| 5 | 37.875 | 8.000 | 1.49700 | 81.54 |
| 6 | −25.657 | 1.200 | 1.90366 | 31.31 |
| 7 | −509.720 | 0.200 | | |
| 8 | 36.328 | 5.600 | 1.48749 | 70.24 |
| 9 | −29.124 | 1.200 | 1.90366 | 31.31 |
| 10 | 35.096 | 0.200 | | |
| 11 | 18.856 | 4.000 | 1.53172 | 48.84 |
| 12 | −210.721 | 7.150 | | |
| STO | Infinity | 0.000 | | |
| 14 | 20.622 | 3.200 | 1.84666 | 23.78 |
| 15 | 246.161 | 3.515 | | |
| *16 | −266.178 | 1.200 | 1.80610 | 40.88 |
| *17 | 20.008 | Variable Interval | | |
| 18 | −590.282 | 6.000 | 1.63980 | 34.47 |
| 19 | −41.561 | Variable Interval | | |
| 20 | 59.920 | 7.000 | 1.57501 | 41.50 |
| 21 | −609.935 | 6.012 | | |
| 22 | −47.461 | 2.000 | 1.84666 | 23.78 |
| 23 | −259.213 | Variable Interval | | |
| *24 | −45.688 | 2.800 | 1.53116 | 56.04 |
| *25 | 50.945 | Variable Interval | | |
| *26 | −59.444 | Variable Interval | | |
| IMG | Infinity | | | |

The following Table 5 shows aspheric coefficients of the lens surfaces of Example 2.

TABLE 5

| | | Aspheric Coefficient | | | |
|---|---|---|---|---|---|
| | K | A04<br>A12 | A06<br>A14 | A08 | A10 |
| 16 | −1.0000 | −9.0000E−05<br>0.0000E+00 | 0.0000E+00<br>0.0000E+00 | 0.0000E+00 | 0.0000E+00 |
| 17 | −0.9033 | −1.5170E−05<br>0.0000E+00 | 3.5669E−08<br>0.0000E+00 | −2.3080E−10 | 0.0000E+00 |
| 24 | −14.5312 | −5.7790E−06<br>−6.3646E−18 | 2.6773E−08<br>0.0000E+00 | −3.5126E−11 | 2.1847E−14 |
| 25 | 0.0000 | −2.5184E−05<br>−3.8361E−17 | 3.8089E−08<br>1.0085E−20 | −5.7101E−11 | 6.0620E−14 |
| 26 | −0.9377 | 3.6543E−08<br>−2.6339E−21 | 4.4815E−11<br>1.6296E−25 | −4.9371E−14 | 1.6311E−17 |

The following Table 6 shows values of variable intervals 17, 19, 23, 25, and 26 in Table 4 at the projection magnification of 125 times, the projection magnification of 100 times, and the projection magnification of 168 times.

TABLE 6

| | Variable Interval | | |
|---|---|---|---|
| | 125x | 100x | 168x |
| 17 | 18.574 | 18.393 | 18.820 |
| 19 | 2.866 | 1.500 | 4.214 |
| 23 | 6.346 | 7.659 | 5.000 |
| 25 | 117.267 | 117.501 | 117.019 |
| 26 | −501.000 | −408.653 | −665.822 |

Figure 9:
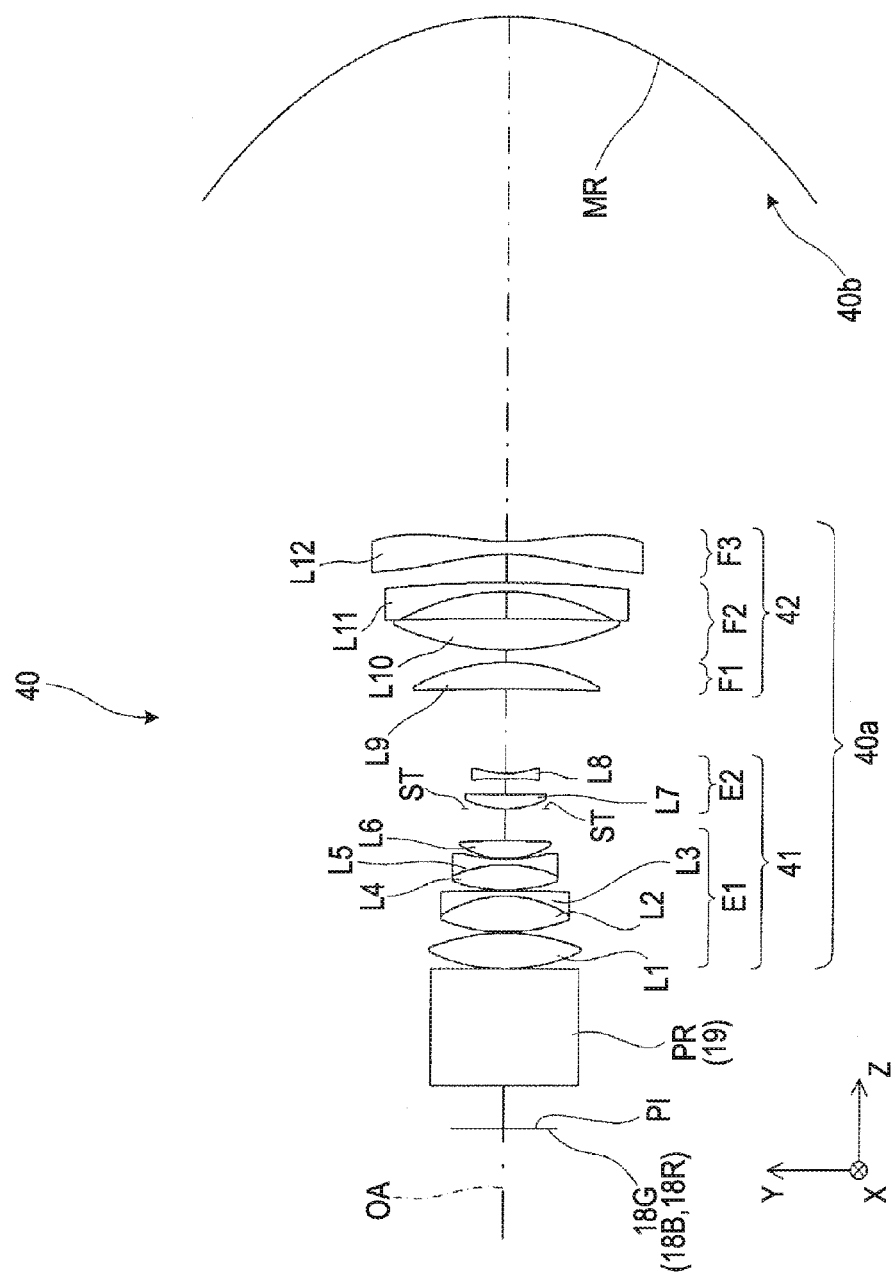
FIG. 9 is a diagram showing a configuration of a projection optical system of Example 2.

FIG. 9 is a sectional diagram showing the projection optical system of Example 2. In Example 2, the first optical group 40a is configured of twelve lenses from the lens L1 (first lens) to the lens L12 (twelfth lens) from the reduction side. The first optical group 40a is configured of the 1-1st lens group 41 that is provided on the reduction side and has the positive power, and the 1-2nd lens group 42 that is provided on the enlargement side and has the positive or negative power lower than the power of the 1-1st lens group 41. The second optical group 40b is configured of one concave aspheric mirror MR. Note that, in FIG. 9, the lens L12 or the mirror MR is drawn without the cutout, but, in an actual optical system, at least the mirror MR has a shape in which a part of the mirror is cutout from the circular shape in some cases. The other lens groups have a shape in which a part thereof is cutout from the circular shape in some cases.

In FIG. 9, the projection optical system 40 performs enlargement projection of an image on the panel surface PI at a magnification depending on a distance to the screen. The projection optical system 40 has twelve lenses L1 to L12 of the lenses L1 to L6 constituting the lens group E1 and the lenses L7 and L8 constituting the lens group E2 of the 1-1st lens group 41, the lens L9 constituting the lens group F1 lens, the lenses L10 and L11 constituting the lens group F2 lens, and the lens L12 constituting the lens group F3 lens of the 1-2nd lens group 42, in this order from the reduction side. For example, as in the case where the projection onto a wall surface is changed to the projection onto a floor surface, the magnification change is performed by the change of a projection position (change of projection distance). When focusing is performed during the magnification change, the 1-1st lens group 41 is fixed as is, whereas the lens groups F1 lens to F3 lens individually move. In other words, the 1-2nd lens group 42 performs focusing by causing the three lens groups F1 lens, F2 lens, and F3 lens to individually move during the magnification change. In this case, it is found from the values in Table 6 that, in the focusing in response to the magnification change, the lens group F2 lens (F2 lens group) of the lens groups F1 lens to F3 lens has the relatively largest amount of movement.

The respective lenses L1 to L12 will be described in detail. The lens L1 as the first lens is a positive lens having a biconvex shape, the lens L2 as the second lens is a positive lens having a biconvex shape, the lens L3 as the third lens is a negative meniscus lens having a concave surface on the reduction side, the second lens and the third lens form the cemented lenses, the lens L4 as the fourth lens is a positive lens having a biconvex shape, the lens L5 as the fifth lens is a negative lens having a biconcave shape, the fourth lens and the fifth lens form the cemented lenses, the lens L6 as the sixth lens is a positive lens having a biconvex shape, the lens L7, as the seventh lens, which is positioned in the rear stage of the aperture ST is a positive meniscus lens having a convex surface on the reduction side, and the lens L8 as the eighth lens is a negative lens having a biconcave shape with aspheric surfaces on both sides. The lens L9 as the ninth lens is a positive meniscus lens having a convex surface on the enlargement side, the lens L10 as the tenth lens is a positive lens having a biconvex shape, the lens L11 as the eleventh lens is a negative meniscus lens having a concave surface on the reduction side, and the lens L12 as the twelfth lens is a double-sided aspheric lens having negative power. The lens L12 has a biconcave shape in the vicinity of the optical axis. The lens L12 is a lens molded out of a resin. Note that, as described above, the second optical group 40b is configured of one concave aspheric mirror.

Figure 10A:
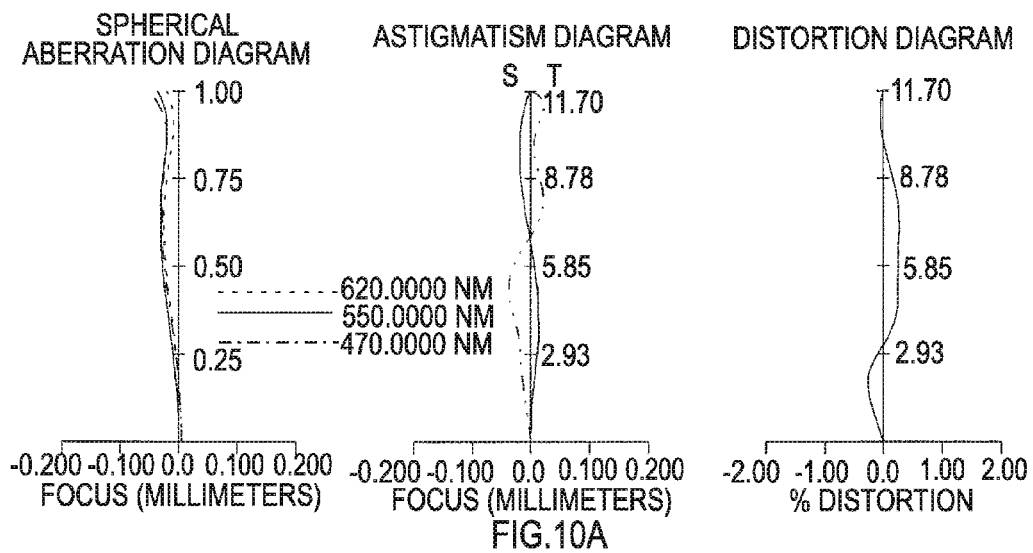
FIGS. 10(A) to 10(C) are diagrams showing aberration on a reduction side of the projection optical system of Example 2.
Figure 10B:
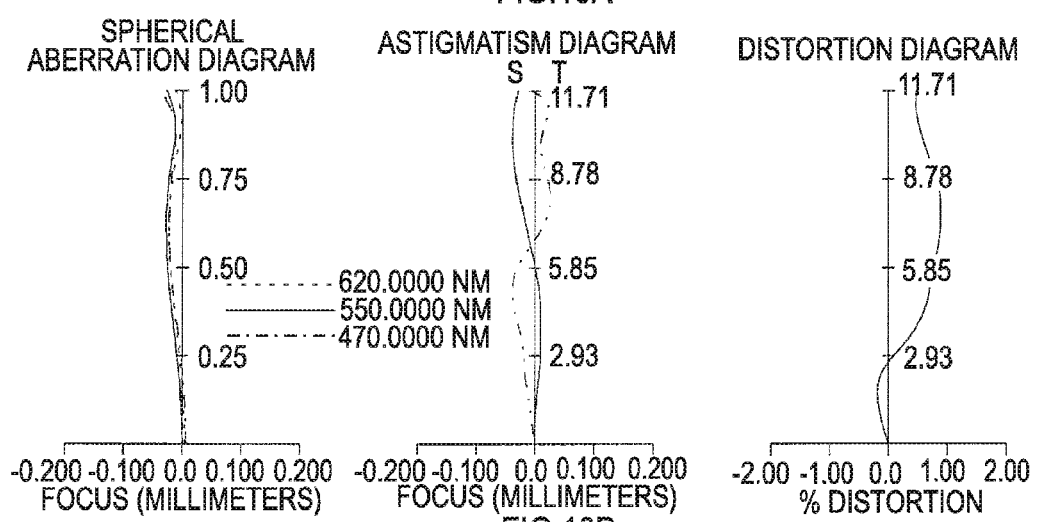
Figure 10C:
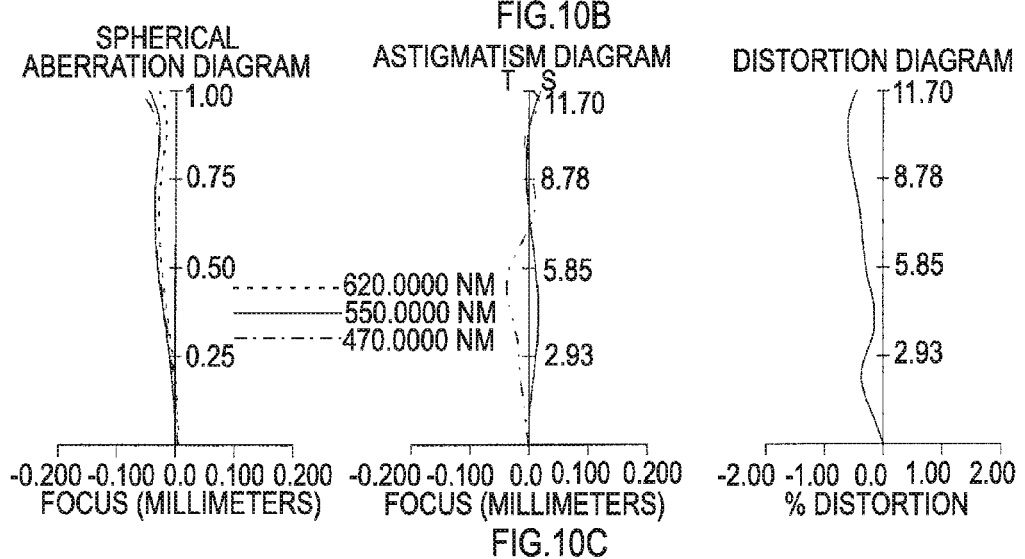
Figure 11A:
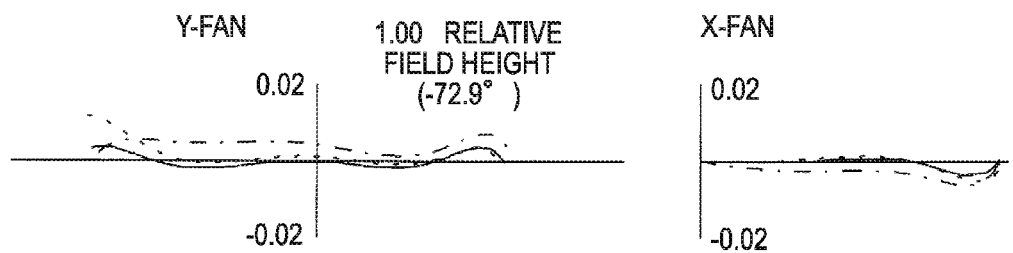
FIGS. 11(A) to 11(E) are diagrams showing lateral aberration of the projection optical system, which correspond to FIG. 10(A).
Figure 11B:
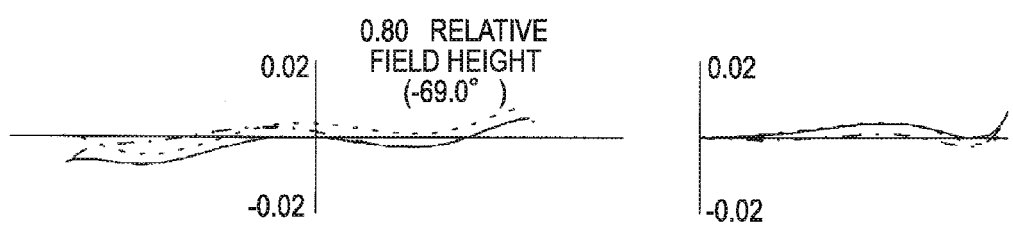
Figure 11C:
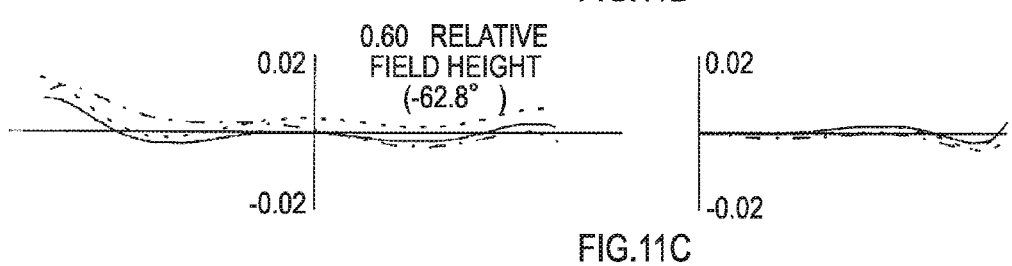
Figure 11D:
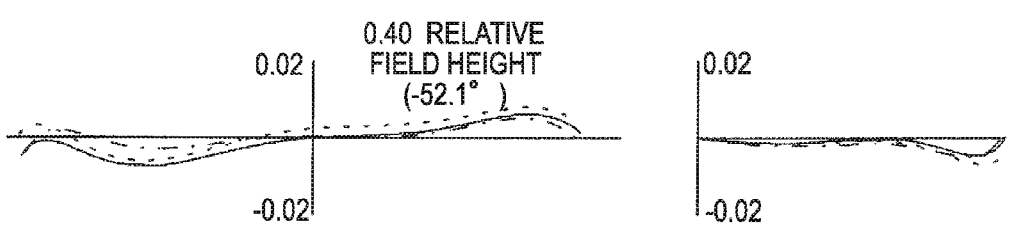
Figure 11E:
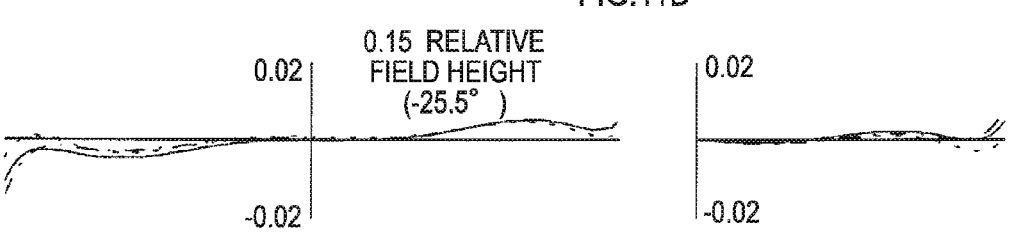
Figure 13A:
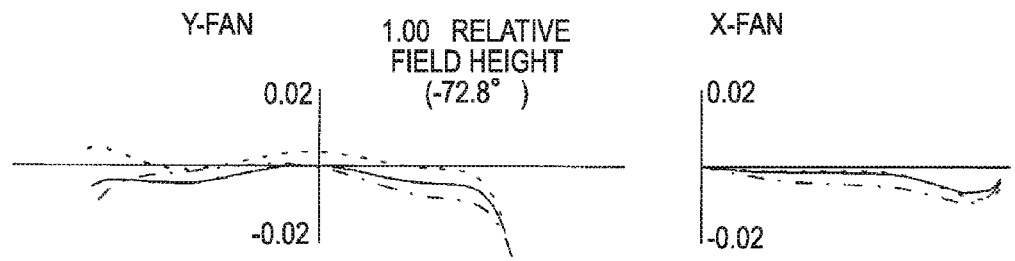
FIGS. 13(A) to 13(E) are diagrams showing lateral aberration of the projection optical system, which correspond to FIG. 10(C).
Figure 13B:
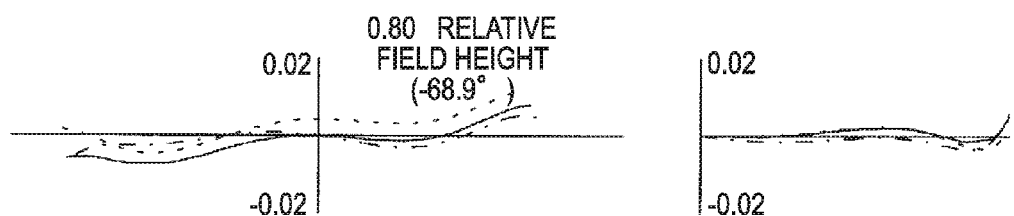
Figure 13C:
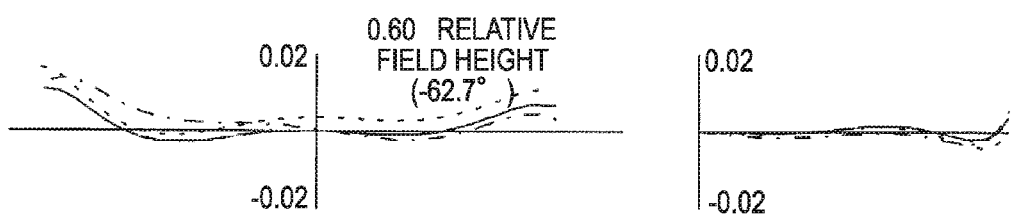
Figure 13D:
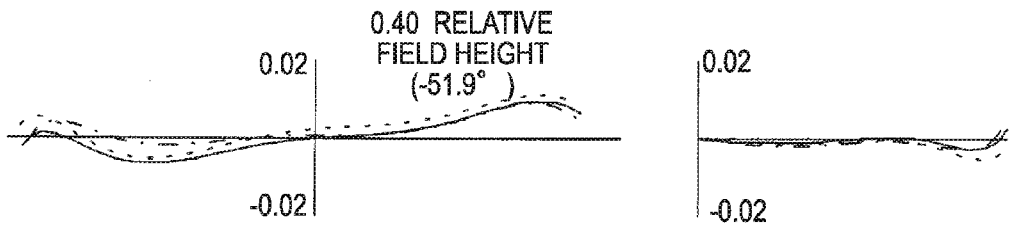
Figure 13E:
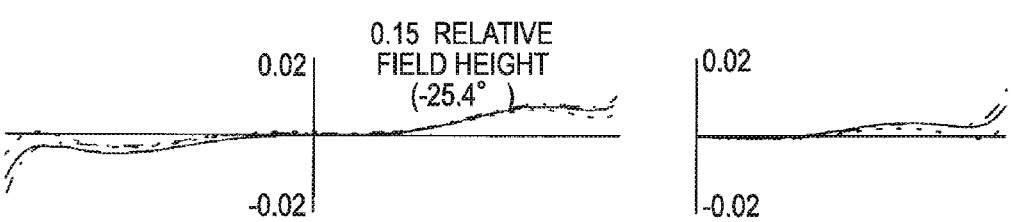

FIG. 10(A) is a diagram showing aberration (spherical aberration, astigmatism, and distortion) on the reduction side of the projection optical system at the projection magnification of 125 times. FIG. 10(B) is a diagram showing aberration on the reduction side of the projection optical system at the projection magnification of 100 times. FIG. 10(C) is a diagram showing aberration on the reduction side of the projection optical system at the projection magnification of 168 times. In addition, FIG. 11(A) to 11(E) are diagrams showing lateral aberration of the projection optical system, which correspond to FIG. 10(A). FIGS. 11(A) to 11(E) show lateral aberration in the field height of 100%, 80%, 60%, 40%, and 15%, respectively. FIG. 11(A) corresponds to a case of the maximum angle of view. Similarly, FIGS. 12(A) to 12(E) are diagrams showing lateral aberration of the projection optical system, which correspond to FIG. 10(B) and FIGS. 13(A) to 13(E) are diagrams showing lateral aberration of the projection optical system, which correspond to FIG. 10(C).

Example 3

Data of lens surfaces of Example 3 is shown in the following Table 7. In the example, brightness is obtained with the numerical aperture NA of 0.3 or higher (that is, F-number of about 1.6).

TABLE 7

| | f 3.719 ω 72.9° NA 0.313 | | | |
|---|---|---|---|---|
| | R | D | Nd | Vd |
| OBJ | Infinity | 9.500 | | |
| 1 | Infinity | 25.910 | 1.51633 | 64.14 |
| 2 | Infinity | 0.000 | | |
| 3 | 26.305 | 9.600 | 1.49700 | 81.54 |
| 4 | −124.322 | 0.200 | | |
| 5 | 26.243 | 7.000 | 1.49700 | 81.54 |
| 6 | Infinity | 1.200 | 1.84666 | 23.78 |
| 7 | 64.519 | 0.200 | | |
| 8 | 23.856 | 10.500 | 1.48749 | 70.24 |
| 9 | −18.490 | 1.200 | 1.90366 | 31.31 |
| 10 | 89.894 | 0.200 | | |
| *11 | 41.453 | 1.400 | 1.73077 | 40.51 |
| *12 | 27.051 | 0.200 | | |
| 13 | 20.658 | 3.000 | 1.48749 | 70.24 |
| 14 | 53.969 | 5.782 | | |
| STO | Infinity | 3.500 | | |
| 16 | 38.464 | 4.200 | 1.84666 | 23.78 |
| 17 | −53.454 | 3.400 | | |
| *18 | 1826.548 | 1.800 | 1.74320 | 49.29 |
| *19 | 22.758 | 17.366 | | |
| 20 | 62.006 | 8.500 | 1.62041 | 60.29 |
| 21 | −162.289 | Variable Interval | | |
| 22 | 65.063 | 12.500 | 1.60342 | 38.03 |
| 23 | −66.874 | 2.000 | 1.84666 | 23.78 |
| 24 | 117.229 | Variable Interval | | |
| *25 | −302.516 | 2.800 | 1.53116 | 56.04 |
| *26 | 34.186 | Variable Interval | | |
| *27 | −55.160 | Variable Interval | | |
| IMG | Infinity | | | |

The following Table 8 shows aspheric coefficients of the lens surfaces of Example 3.

TABLE 8

| | Aspheric Coefficient | | | | |
|---|---|---|---|---|---|
| | K | A04 A12 | A06 A14 | A08 | A10 |
| 11 | 1.5680 | −1.8462E−04 0.0000E+00 | 1.0795E−06 0.0000E+00 | −8.9307E−10 | 0.0000E+00 |
| 12 | −1.3000 | −1.4552E−04 0.0000E+00 | 1.2026E−06 0.0000E+00 | −2.8852E−09 | 7.1787E−12 |
| 18 | −1.0000 | −4.9287E−05 0.0000E+00 | 0.0000E+00 0.0000E+00 | 0.0000E+00 | 0.0000E+00 |
| 19 | −0.8800 | −2.1276E−05 0.0000E+00 | 2.3023E−08 0.0000E+00 | 3.4187E−11 | 0.0000E+00 |
| 25 | 90.0000 | 5.2778E−06 8.7070E−18 | 3.5342E−10 0.0000E+00 | 6.8860E−12 | −1.5465E−14 |
| 26 | 0.0000 | −1.9738E−05 −2.7739E−17 | 2.4506E−08 9.7163E−21 | −3.2514E−11 | 3.3868E−14 |

TABLE 8-continued

| | | Aspheric Coefficient | | | |
|---|---|---|---|---|---|
| | K | A04 A12 | A06 A14 | A08 | A10 |
| 27 | −1.0000 | 1.6556E−07 −1.4931E−22 | −7.4646E−11 1.8865E−26 | 9.9551E−15 | −7.2864E−19 |

The following Table 9 shows values of variable intervals 21, 24, 26, and 27 in Table 7 at the projection magnification of 125 times, the projection magnification of 100 times, and the projection magnification of 169 times.

TABLE 9

| | Variable Interval | | |
|---|---|---|---|
| | 125x | 100x | 169x |
| 21 | 7.485 | 4.000 | 11.432 |
| 24 | 15.115 | 18.271 | 11.500 |
| 26 | 114.442 | 114.771 | 114.110 |
| 27 | −501.000 | −407.448 | −667.954 |

Figure 14:
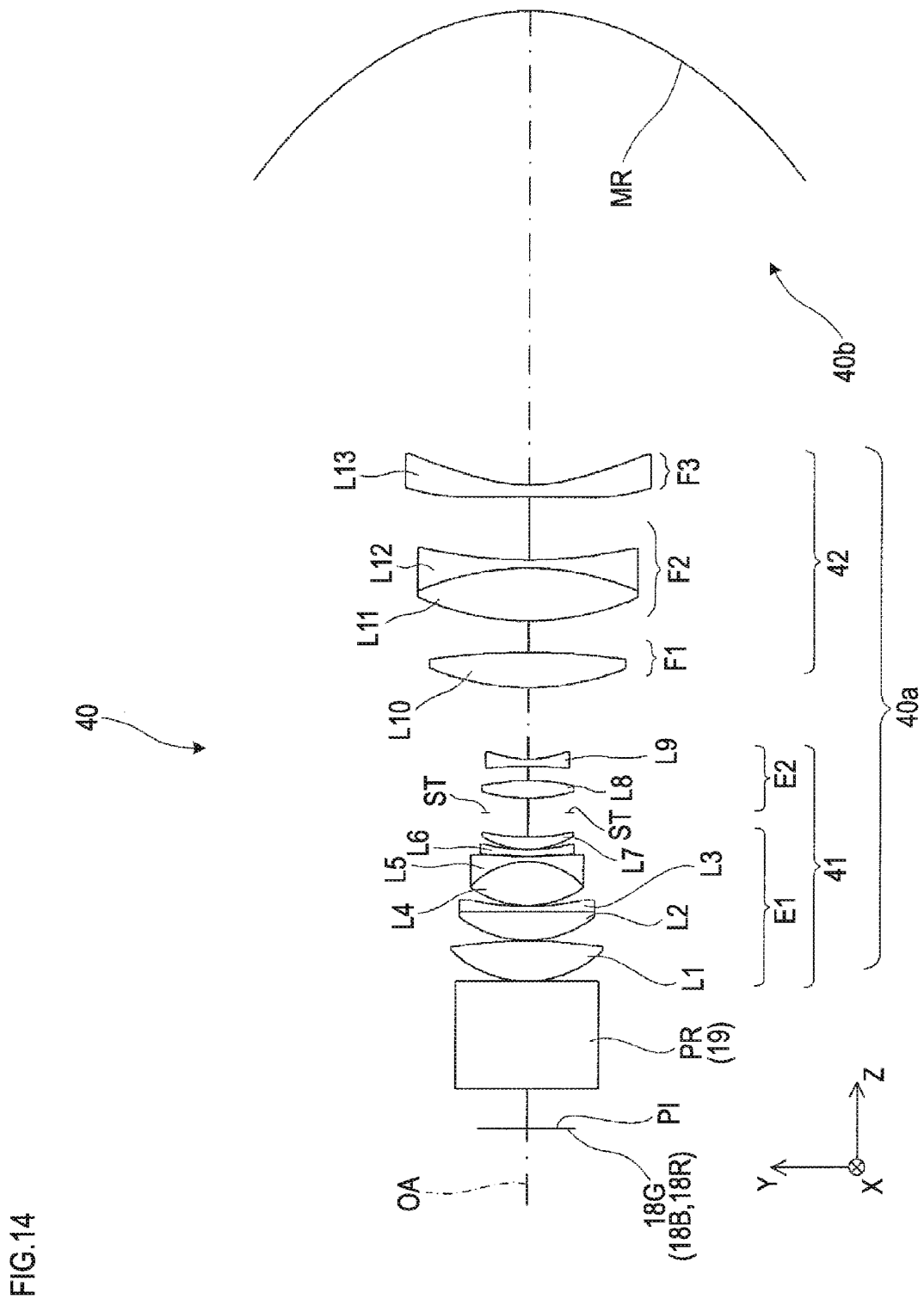
FIG. 14 is a diagram showing a configuration of a projection optical system of Example 3.

FIG. 14 is a sectional diagram showing the projection optical system of Example 3. In Example 3, the first optical group 40a is configured of 13 lenses from the lens L1 (first lens) to the lens L13 (thirteenth lens) from the reduction side. The first optical group 40a is configured of the 1-1st lens group 41 that is provided on the reduction side and has the positive power, and the 1-2nd lens group 42 that is provided on the enlargement side and has the positive or negative power lower than the power of the 1-1st lens group 41. The second optical group 40b is configured of one concave aspheric mirror MR. Note that, in FIG. 14, the lens L13 or the mirror MR is drawn without the cutout, but, in an actual optical system, at least the mirror MR has a shape in which a part of the mirror is cutout from the circular shape in some cases. The other lens groups have a shape in which a part thereof is cutout from the circular shape in some cases.

In FIG. 14, the projection optical system 40 performs enlargement projection of an image on the panel surface PI at a magnification depending on a distance to the screen. The projection optical system 40 has 13 lenses L1 to L13 of the lenses L1 to L7 constituting the lens group E1 and the lenses L8 and L9 constituting the lens group E2 of the 1-1st lens group 41, the lens L10 constituting the lens group F1 lens , the lenses L11 and L12 constituting the lens group F2 lens , and the lens L13 constituting the lens group F3 lens of the 1-2nd lens group 42, in this order from the reduction side. For example, as in the case where the projection onto a wall surface is changed to the projection onto a floor surface, the magnification change is performed by the change of a projection position (change of projection distance). When focusing is performed during the magnification change, the 1-1st lens group 41 and the lens group F3 lens are fixed as is, whereas the lens groups F1 lens and F2 lens individually move. In other words, the 1-2nd lens group 42 performs focusing by causing the two lens groups F1 lens and F2 lens to individually move during the magnification change. In this case, it is found from the values in Table 9 that, in the focusing in response to the magnification change, the lens group F2 lens (F2 lens lens group) of the lens groups F1 lens and F2 lens has the relatively largest amount of movement.

The respective lenses L1 to L13 will be described in detail. The lens L1 as the first lens is a positive lens having a biconvex shape, the lens L2 as the second lens is a positive lens with a positive plano-convex shape having a convex surface on the reduction side, the lens L3 as the third lens is a negative lens with a plano-concave shape having a concave surface on the reduction side, the second lens and the third lens form the cemented lenses, the lens L4 as the fourth lens is a positive lens having a biconvex shape, the lens L5 as the fifth lens is a negative lens having a biconcave shape, the fourth lens and the fifth lens form the cemented lenses, the lens L6 as the sixth lens is a negative meniscus lens having aspheric surfaces on both sides. The lens L6 has a convex surface on the reduction side. The lens L7 as the seventh lens is a positive meniscus lens having a convex surface on the reduction side, the lens L8, as the eighth lens, which is positioned on the rear stage of the aperture ST, is a positive lens having a biconvex shape, and the lens L9 as the ninth lens is a double-sided aspheric lens having negative power. The lens L9 has a biconcave shape. In addition, the lens L10 as the tenth lens is a positive lens having a biconvex shape, the lens L11 as the eleventh lens is a positive lens having a biconvex shape, and the lens L12 as the twelfth lens is a negative lens having a biconcave shape, and the lens L13 as the thirteenth lens has double-sided aspheric lens having negative power. The lens L13 has a biconcave shape in the vicinity of the optical axis. The lens L13 is a lens molded out of a resin. Note that, as described above, the second optical group 40b is configured of one concave aspheric mirror.

Figure 15A:
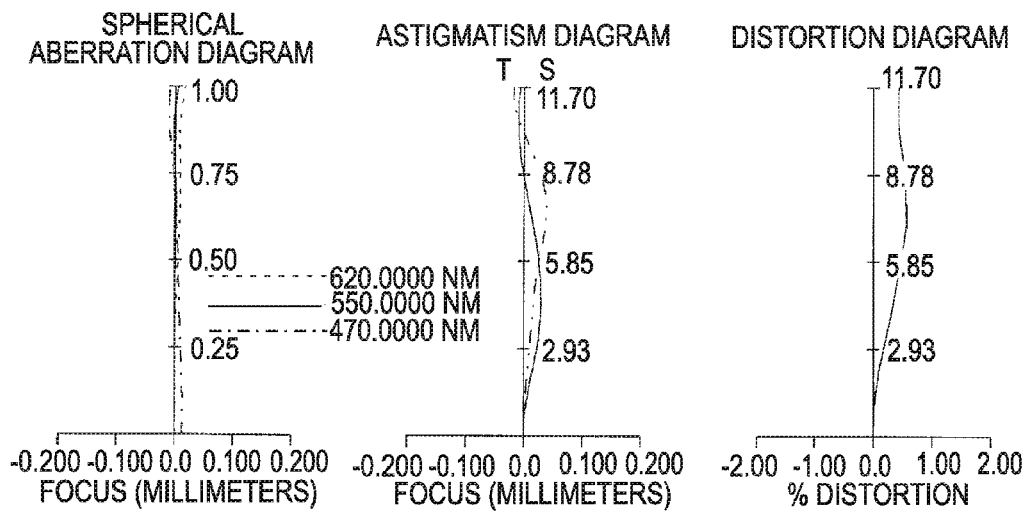
FIGS. 15(A) to 15(C) are diagrams showing aberration on a reduction side of the projection optical system of Example 3.
Figure 15B:
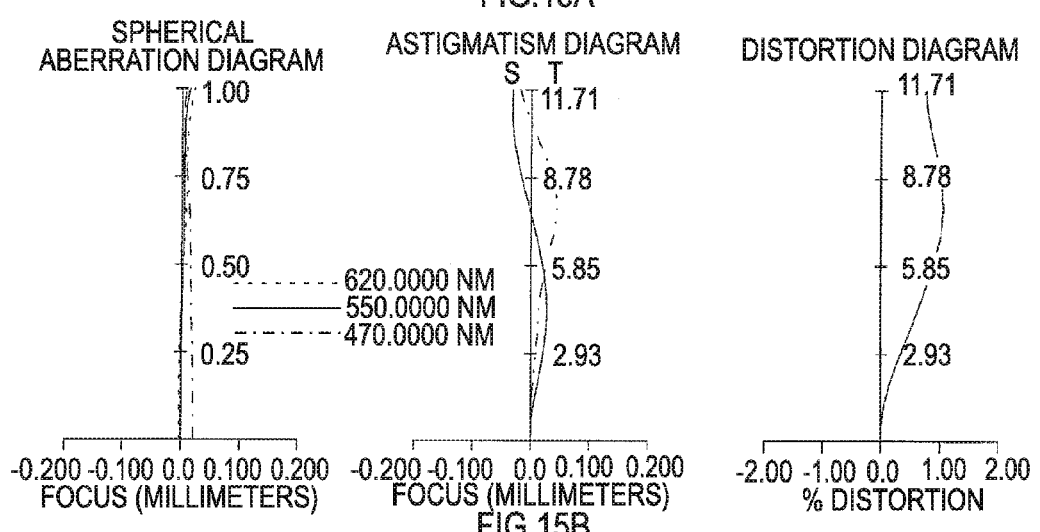
Figure 15C:
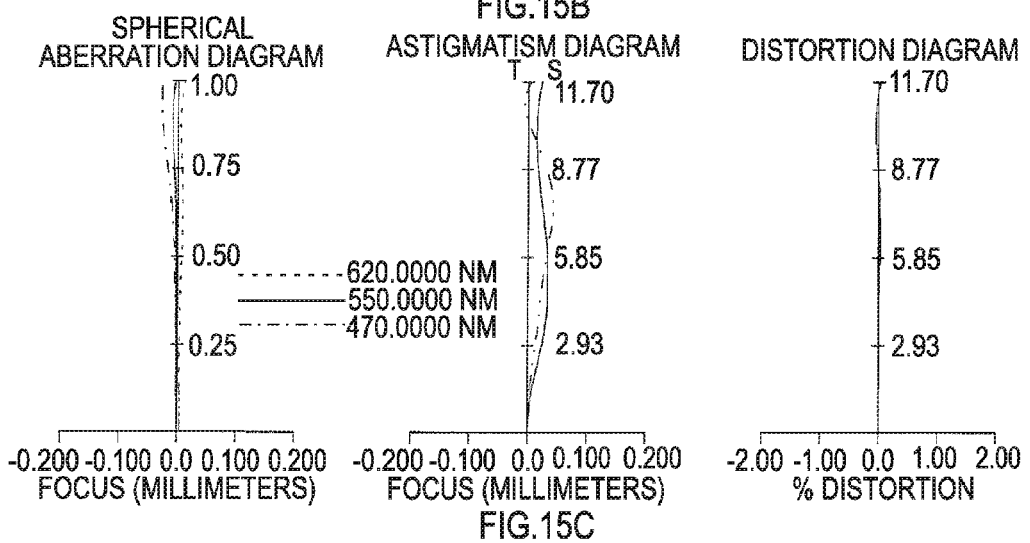
Figure 16A:
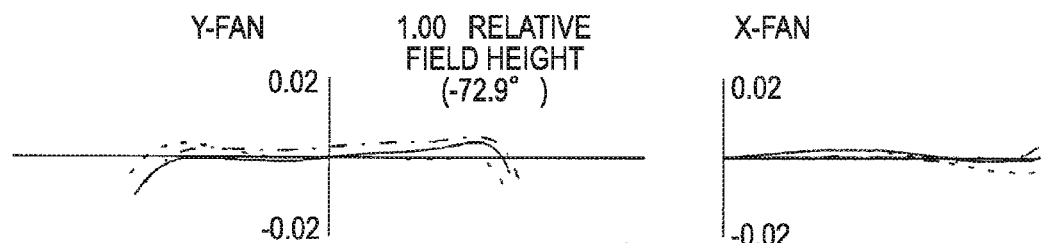
FIGS. 16(A) to 16(E) are diagrams showing lateral aberration of the projection optical system, which correspond to FIG. 15(A).
Figure 16B:
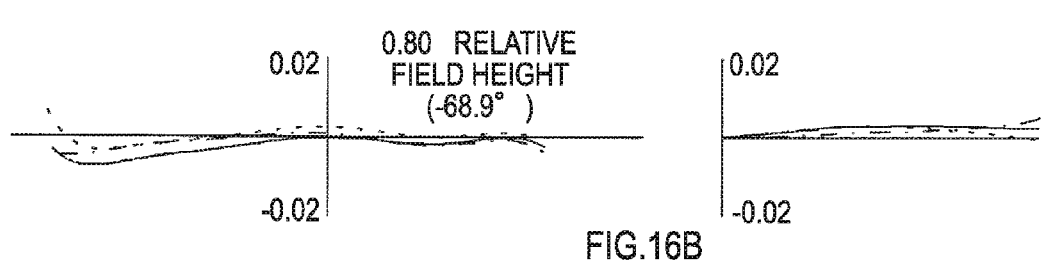
Figure 16C:
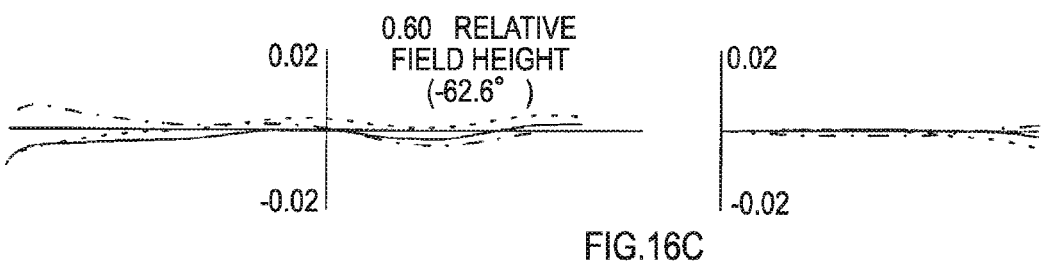
Figure 16D:
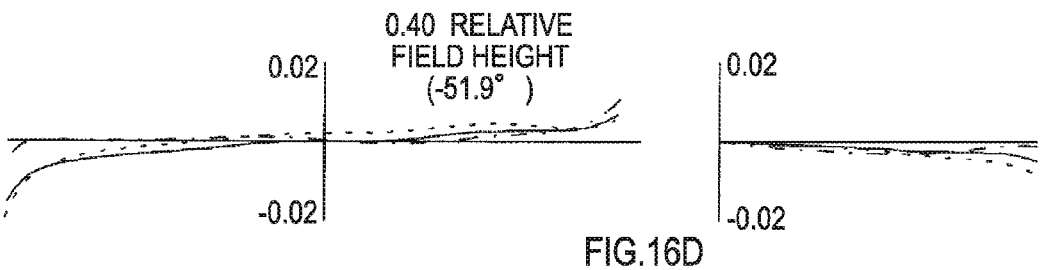
Figure 16E:
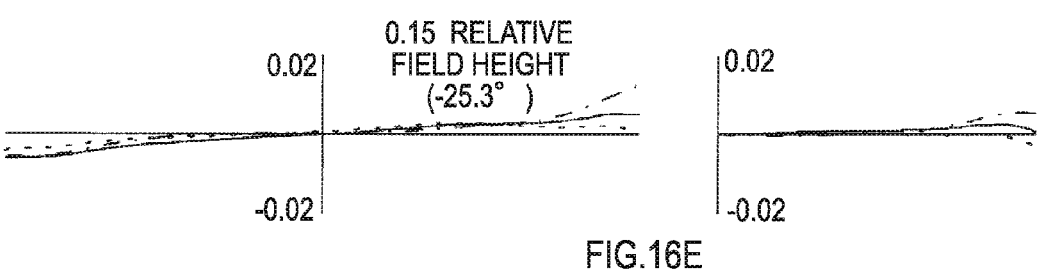
Figure 17A:
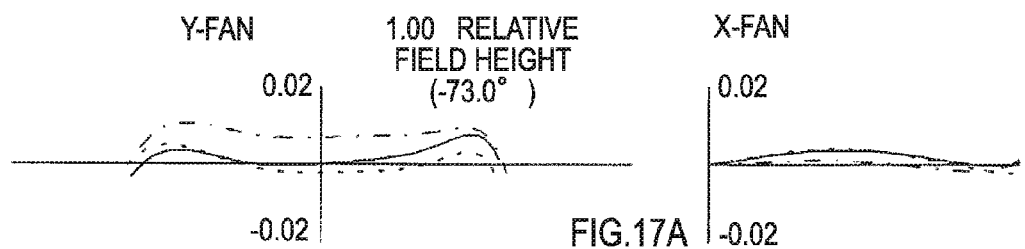
FIGS. 17(A) to 17(E) are diagrams showing lateral aberration of the projection optical system, which correspond to FIG. 15(B).
Figure 17B:
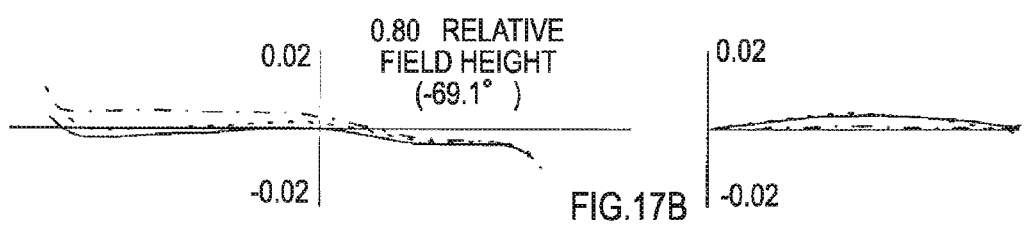
Figure 17C:
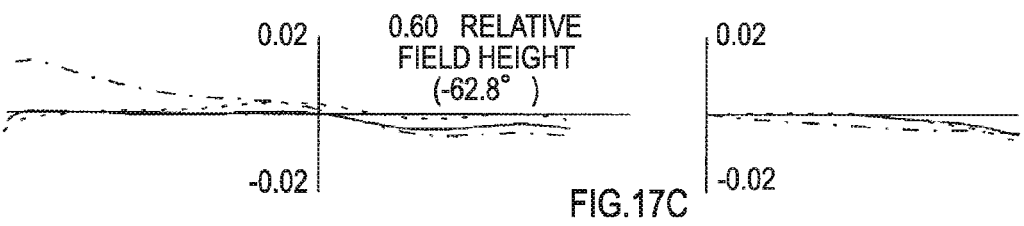
Figure 17D:
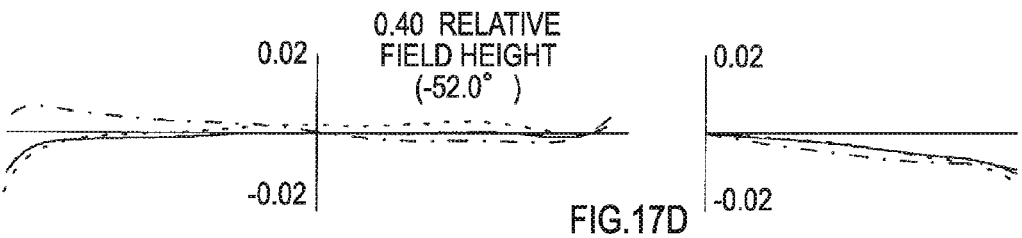
Figure 17E:
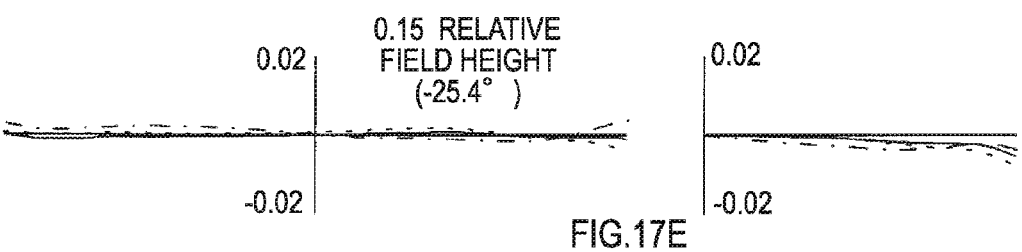
Figure 18A:
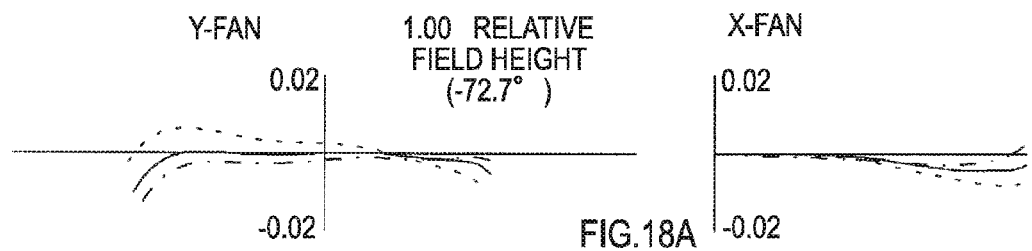
FIGS. 18(A) to 18(E) are diagrams showing lateral aberration of the projection optical system, which correspond to FIG. 15(C).
Figure 18B:
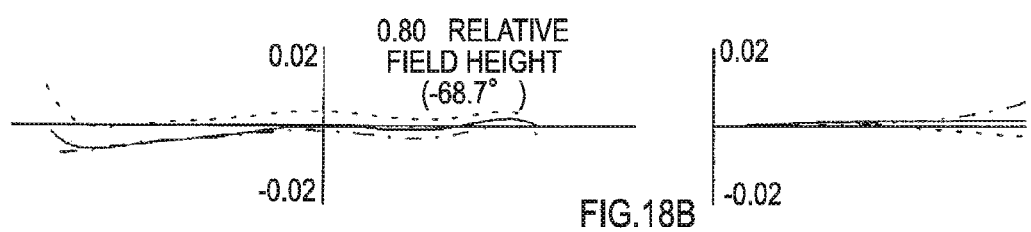
Figure 18C:
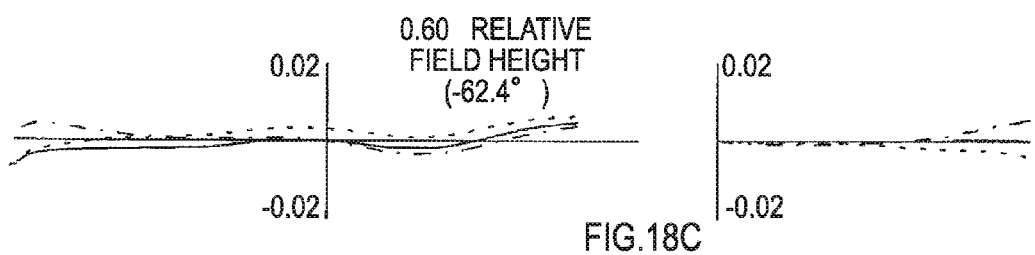
Figure 18D:
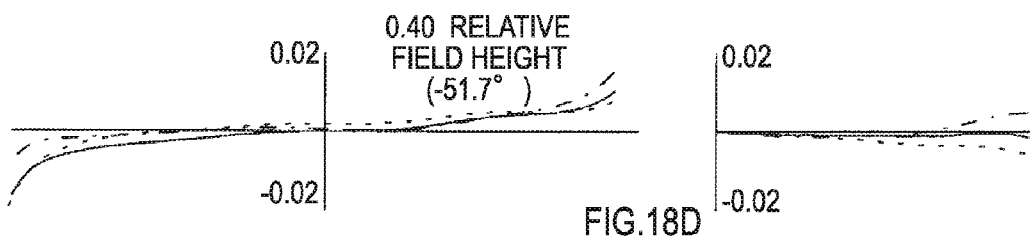
Figure 18E:
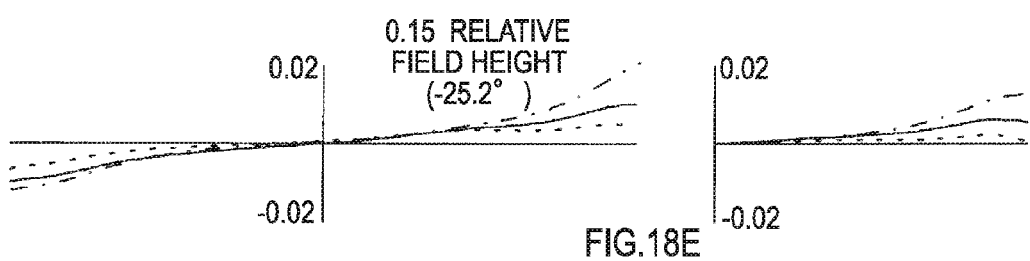

FIG. 15(A) is a diagram showing aberration (spherical aberration, astigmatism, and distortion) on the reduction side of the projection optical system at the projection magnification of 125 times. FIG. 15(B) is a diagram showing aberration on the reduction side of the projection optical system at the projection magnification of 100 times. FIG. 15(C) is a diagram showing aberration on the reduction side of the projection optical system at the projection magnification of 169 times. In addition, FIG. 16(A) to 16(E) are diagrams showing lateral aberration of the projection optical system, which correspond to FIG. 15(A). FIGS. 16(A) to 16(E) show lateral aberration in the field height of 100%, 80%, 60%, 40%, and 15%, respectively. FIG. 16(A) corresponds to a case of the maximum angle of view. Similarly, FIGS. 17(A) to 17(E) are diagrams showing lateral aberration of the projection optical system, which correspond to FIG. 15(B) and FIGS. 18(A) to 18(E) are diagrams showing lateral aberration of the projection optical system, which correspond to FIG. 15(C).

Example 4

Data of lens surfaces of Example 4 is shown in the following Table 10. In the example, brightness is obtained with the numerical aperture NA of 0.3 or higher (that is, F-number of about 1.6).

TABLE 10

| | f 3.711 | | |
| | ω 72.8° | | |
| | NA 0.313 | | |
| | R | D | Nd | Vd |
|---|---|---|---|---|
| OBJ | Infinity | 9.500 | | |
| 1 | Infinity | 25.910 | 1.51633 | 64.14 |
| 2 | Infinity | 0.000 | | |
| 3 | 28.524 | 9.600 | 1.49700 | 81.54 |
| 4 | −72.313 | 0.200 | | |
| 5 | 32.478 | 7.000 | 1.49700 | 81.54 |
| 6 | −87.794 | 1.200 | 1.84666 | 23.78 |
| 7 | 147.781 | 0.200 | | |
| 8 | 22.334 | 10.500 | 1.48749 | 70.24 |
| 9 | −18.208 | 1.200 | 1.90366 | 31.31 |
| 10 | 47.623 | 0.700 | | |
| *11 | 25.698 | 3.000 | 1.51633 | 64.06 |
| *12 | 35.825 | 6.000 | | |
| STO | Infinity | 0.000 | | |
| 14 | 28.025 | 4.200 | 1.84666 | 23.78 |
| 15 | −63.313 | 3.400 | | |
| *16 | Infinity | 1.800 | 1.80610 | 40.88 |
| *17 | 24.186 | 22.270 | | |
| 18 | 71.585 | 8.770 | 1.51742 | 52.43 |
| 19 | −85.996 | Variable Interval | | |
| 20 | 50.146 | 8.215 | 1.54072 | 47.23 |
| 21 | 325.944 | 5.905 | | |
| 22 | −66.464 | 2.000 | 1.84666 | 23.78 |
| 23 | −5402.499 | Variable Interval | | |
| *24 | −302.390 | 2.800 | 1.53116 | 56.04 |
| *25 | 36.048 | 115.087 | | |
| *26 | −57.279 | Variable Interval | | |
| IMG | Infinity | | | |

The following Table 11 shows aspheric coefficients of the lens surfaces of Example 4.

TABLE 11

| | Aspheric Coefficient | | | | |
|---|---|---|---|---|---|
| | K | A04 | A06 | A08 | A10 |
| | | A12 | A14 | | |
| 11 | −2.1049 | −8.4817E−05 | −1.6727E−07 | 1.8335E−09 | 4.7369E−12 |
| | | 0.0000E+00 | 0.0000E+00 | | |
| 12 | 0.0000 | −9.3750E−05 | −3.1676E−07 | 2.4164E−09 | 0.0000E+00 |
| | | 0.0000E+00 | 0.0000E+00 | | |
| 16 | −1.0000 | −9.1711E−05 | 9.9512E−08 | 2.9916E−10 | 2.4116E−12 |
| | | 0.0000E+00 | 0.0000E+00 | | |
| 17 | −2.1458 | −3.9947E−05 | 1.8057E−07 | 1.9727E−10 | 0.0000E+00 |
| | | 0.0000E+00 | 0.0000E+00 | | |
| 24 | 90.0000 | −1.1945E−06 | 5.5783E−09 | 4.3827E−12 | −1.3895E−14 |
| | | 8.7070E−18 | 0.0000E+00 | | |
| 25 | 0.0000 | −2.3623E−05 | 3.0305E−08 | −4.2316E−11 | 4.4659E−14 |
| | | −3.2202E−17 | 1.0593E−20 | | |
| 26 | −1.0000 | 1.1034E−07 | −4.4906E−11 | −3.6620E−15 | 3.2666E−18 |
| | | −7.5941E−22 | 5.6487E−26 | | |

The following Table 12 shows values of variable intervals 19, 23, and 26 in Table 10 at the projection magnification of 125 times, the projection magnification of 100 times, and the projection magnification of 169 times.

TABLE 12

| | Variable Interval | | |
|---|---|---|---|
| | 125x | 100x | 169x |
| 19 | 5.733 | 4.000 | 7.543 |
| 23 | 13.810 | 15.543 | 12.000 |
| 26 | −501.000 | −409.575 | −663.853 |

Figure 19:
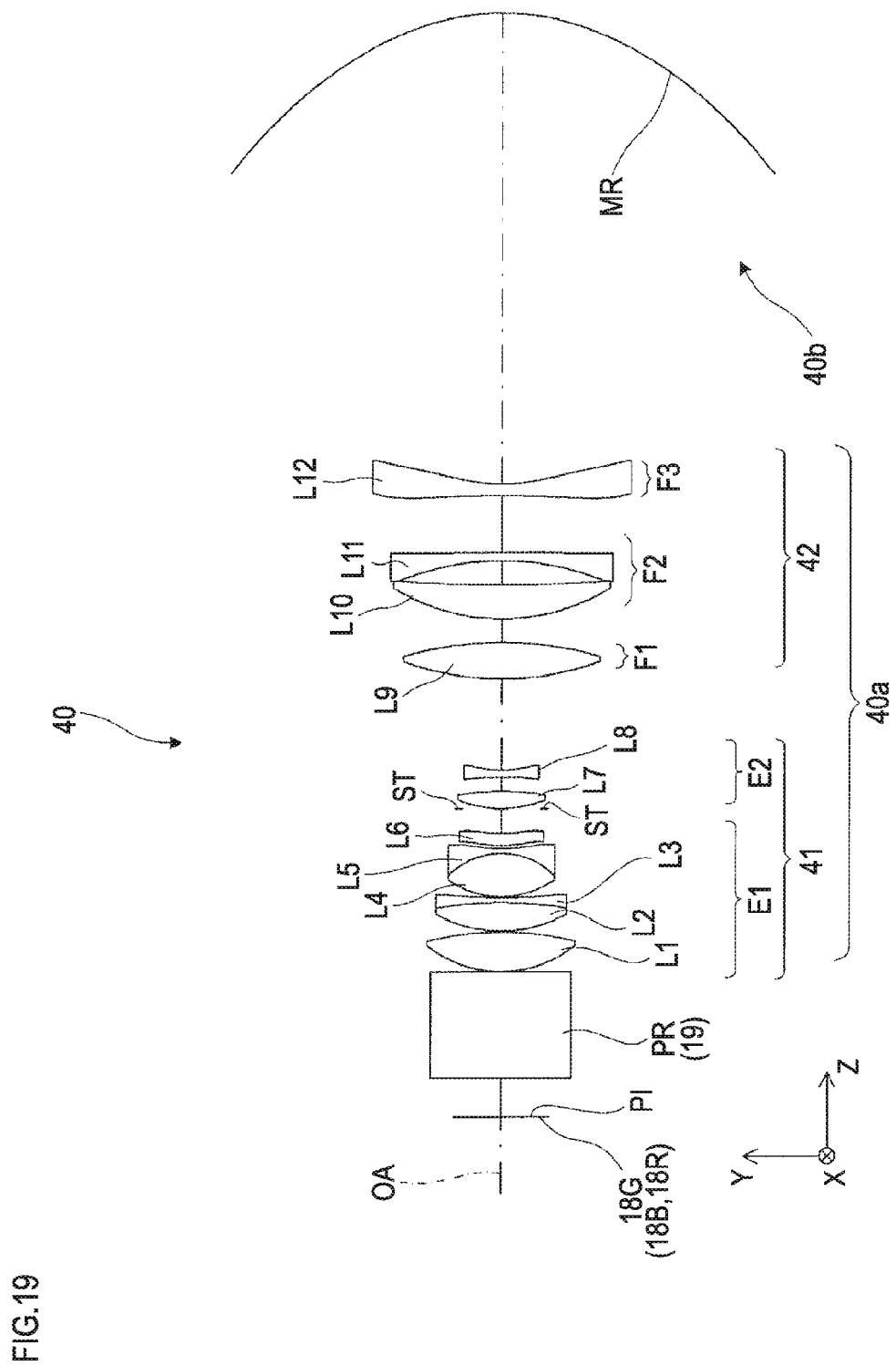
FIG. 19 is a diagram showing a configuration of a projection optical system of Example 4.

FIG. 19 is a sectional diagram showing the projection optical system of Example 4. In Example 4, the first optical group 40a is configured of twelve lenses from the lens L1 (first lens) to the lens L12 (twelfth lens) from the reduction side. The first optical group 40a is configured of the 1-1st lens group 41 that is provided on the reduction side and has the positive power, and the 1-2nd lens group 42 that is provided on the enlargement side and has the positive or negative power lower than the power of the 1-1st lens group 41. The second optical group 40b is configured of one concave aspheric mirror MR. Note that, in FIG. 19, the lens L12 or the mirror MR is drawn without the cutout, but, in an actual optical system, at least the mirror MR has a shape in which a part of the mirror is cutout from the circular shape in some cases. The other lens groups have a shape in which a part thereof is cutout from the circular shape in some cases.

In FIG. 19, the projection optical system 40 performs enlargement projection of an image on the panel surface PI at a magnification depending on a distance to the screen. The projection optical system 40 has twelve lenses L1 to L12 of the lenses L1 to L6 constituting the lens group E1 and the lenses L7 and L8 constituting the lens group E2 of the 1-1st lens group 41, the lens L9 constituting the lens group F1 lens, the lenses L10 and L11 constituting the lens group F2 lens, and the lens L12 constituting the lens group F3 lens of the 1-2nd lens group 42, in this order from the reduction side. For example, as in the case where the projection onto a wall surface is changed to the projection onto a floor surface, the magnification change is performed by the change of a projection position (change of projection distance). When focusing is performed during the magnification change, the 1-1st lens group 41 and the lens groups F2 lens and F3 lens are fixed as are, whereas the lens group F2 lens moves. In other words, the 1-2nd lens group 42 performs focusing by causing the lens group F2 lens to move during the magnification change.

The respective lenses L1 to L12 will be described in detail. The lens L1 as the first lens is a positive lens having a biconvex shape, the lens L2 as the second lens is a positive lens having a biconvex shape, the lens L3 as the third lens is a negative lens having a biconcave shape, the second lens and the third lens form the cemented lenses, the lens L4 as the fourth lens is a positive lens having a biconvex shape, the lens L5 as the fifth lens is a negative lens having a biconcave shape, the fourth lens and the fifth lens form the cemented lenses, and the lens L6 as the sixth lens is a positive meniscus lens having aspheric surfaces on both sides. The lens L6 has the convex surface on the reduction side. The lens L7, as the seventh lens, which is positioned in the rear stage of the aperture ST is a positive lens having a biconvex shape, and the lens L8 as the eighth lens is a double-sided aspheric lens having negative power. The lens L8 has a biconcave shape. The lens L9 as the ninth lens is a positive lens having a biconvex shape, the lens L10 as the tenth lens is a positive meniscus lens having a convex surface on the reduction side, the lens L11 as the eleventh lens is a negative meniscus lens having a concave surface on the reduction side, and the lens L12 as the twelfth lens is a double-sided aspheric lens having negative power. The lens L12 has a biconcave shape in the vicinity of the optical axis. The lens L12 is a lens molded out of a resin. Note that, as described above, the second optical group 40b is configured of one concave aspheric mirror.

Figure 20A:
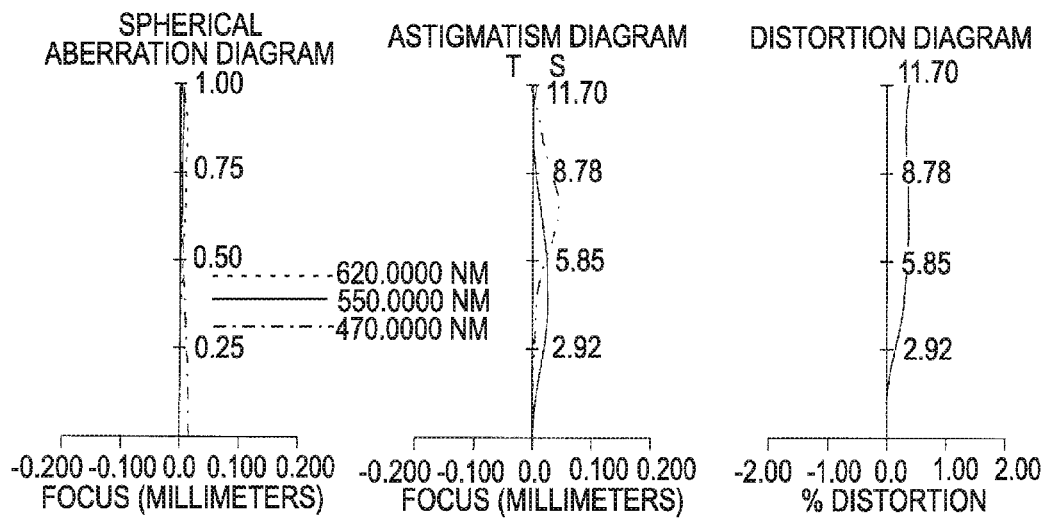
FIGS. 20(A) to 20(C) are diagrams showing aberration on a reduction side of the projection optical system of Example 4.
Figure 20B:
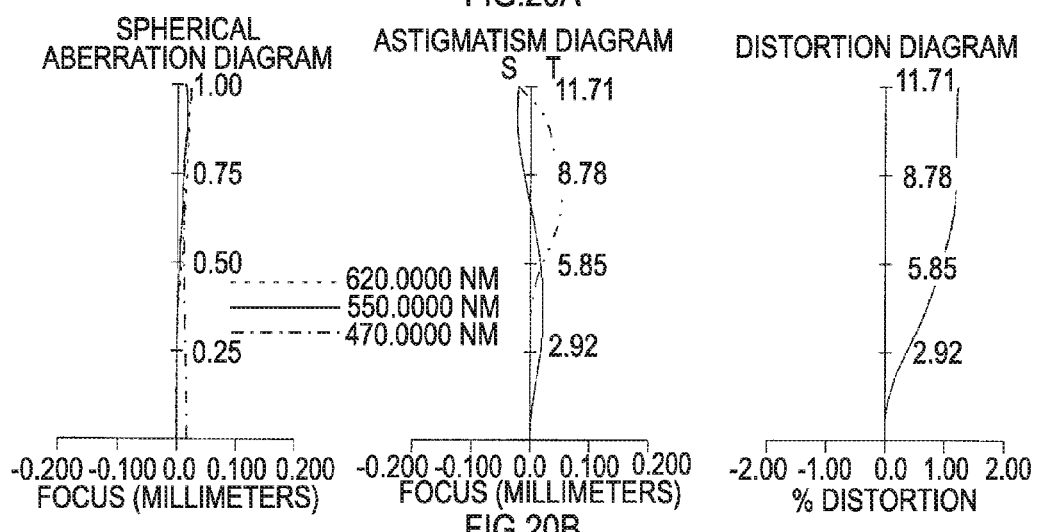
Figure 20C:
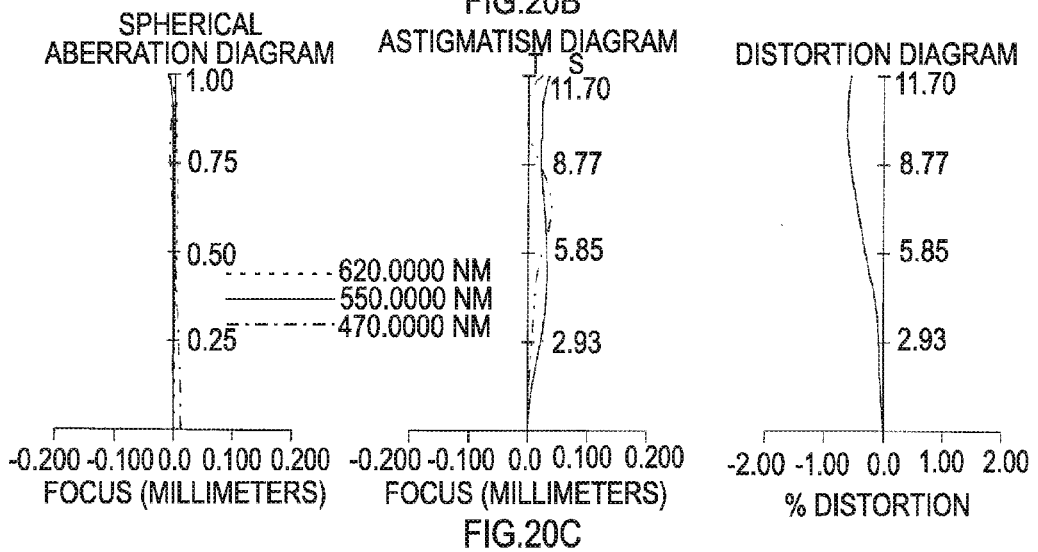
Figure 21A:
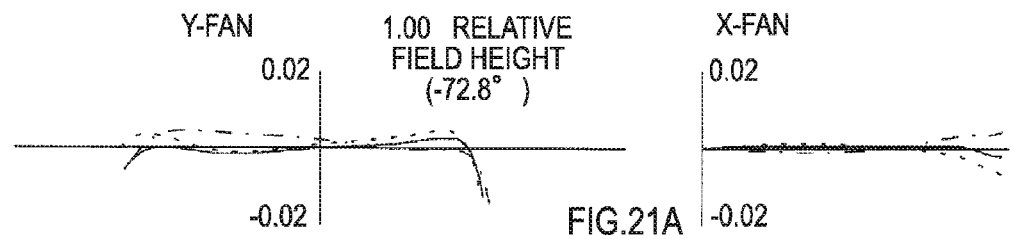
FIGS. 21(A) to 21(E) are diagrams showing lateral aberration of the projection optical system, which correspond to FIG. 20(A).
Figure 21B:
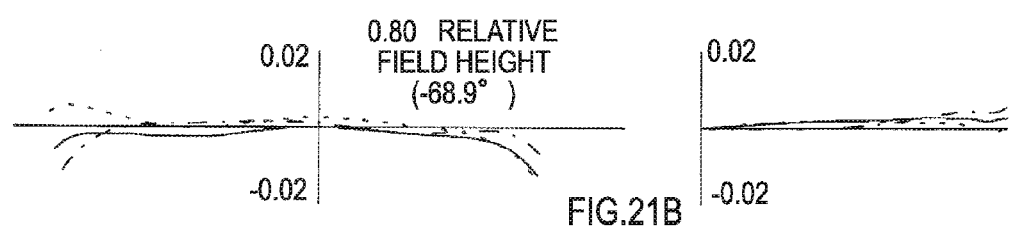
Figure 21C:
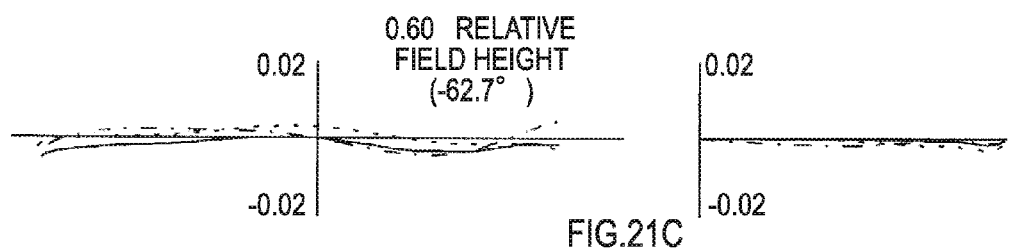
Figure 21D:
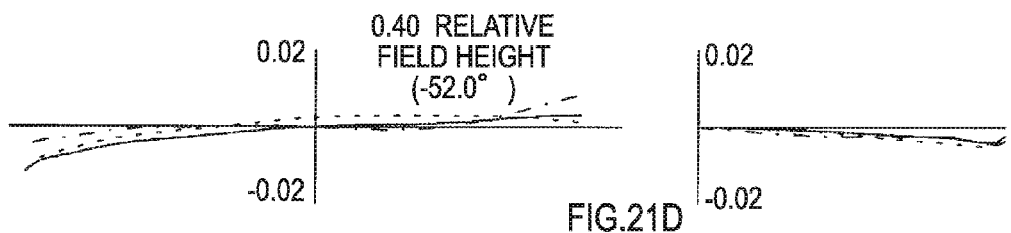
Figure 21E:
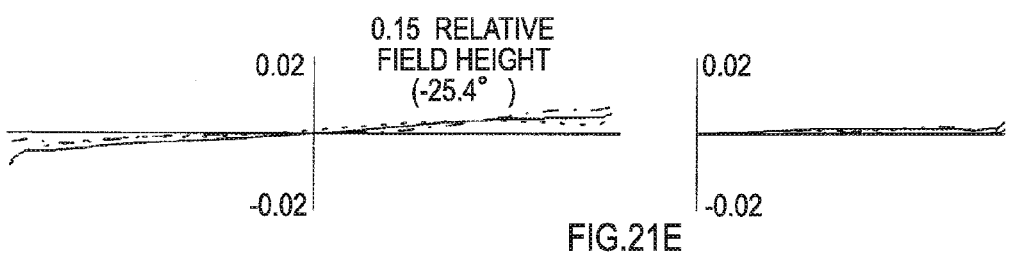

FIG. 20(A) is a diagram showing aberration (spherical aberration, astigmatism, and distortion) on the reduction side of the projection optical system at the projection magnification of 125 times. FIG. 20(B) is a diagram showing aberration on the reduction side of the projection optical system at the projection magnification of 100 times. FIG. 20(C) is a diagram showing aberration on the reduction side of the projection optical system at the projection magnification of 169 times. In addition, FIG. 21(A) to 21(E) are diagrams showing lateral aberration of the projection optical system, which correspond to FIG. 20(A). FIGS. 21(A) to 21(E) show lateral aberration in the field height of 100%, 80%, 60%, 40%, and 15%, respectively. FIG. 21(A) corresponds to a case of the maximum angle of view. Similarly, FIGS. 22(A) to 22(E) are diagrams showing lateral aberration of the projection optical system, which correspond to FIG. 20(B) and FIGS. 23(A) to 23(E) are diagrams showing lateral aberration of the projection optical system, which correspond to FIG. 20(C).

Summing-up of Examples

In any one of Examples, a simple configuration, in which the lens group F3 lens (F3 lens group) is only one aspheric resin lens in the 1-2nd lens group 42 as the focus lens group, and the 1-2nd lens group 42 has four lenses (two positive lenses and two negative lenses), is employed while realizing a wide angle of view equal to or greater than a half angle of view of 70° at a wide angle end. In addition, the projection optical system 40 as a whole is configured of the small number of 12 to 13 lenses.

The invention is not limited to the embodiments or examples described above and can be performed in various aspects within a range without departing from the gist thereof.

For example, in the respective Examples, one or more lenses having substantially no power may be added before and after or between the lenses constituting each lens group.

In addition, a target of the enlargement projection by the projection optical system 40 is not limited to the liquid crystal panel, but it is possible for the projection optical system 40 to perform the enlargement projection of an image formed by various optical modulators such as a digital micromirror device, in which a micromirror functions as a pixel.

The entire disclosure of Japanese Patent Application No. 2015-119002, filed Jun. 12, 2015 is expressly incorporated by reference herein.

The invention claimed is:

1. A projection optical system comprising, in order from a reduction side:
   a first optical group that is configured of a plurality of lenses and has positive power; and
   a second optical group that has a reflective surface having a concave aspheric shape,
   wherein the first optical group is configured to have a 1-1st lens group which is fixed when focusing is performed in response to a magnification change and has positive power, and a 1-2nd lens group which, as a whole, has positive power,
   wherein the 1-2nd lens group includes, in order from the reduction side, three lens groups of an F1 lens group configured of one positive lens, an F2 lens group configured of one positive lens and one negative lens, and an F3 lens group configured of one negative lens, and at least the F2 lens group is caused to move when focusing is performed in response to the magnification change, and
   wherein the 1-1st lens group and the 1-2nd lens group are separate lens groups.

2. The projection optical system according to claim 1, wherein the F3 lens group is configured of a double-sided aspheric lens molded out of a resin.

3. The projection optical system according to claim 1, wherein the F1 lens group is configured of a positive lens having a convex surface on an enlargement side,
   wherein the F2 lens group is configured of a positive lens having a convex surface on the reduction side and a negative lens having a concave surface on the reduction side,
   wherein the F3 lens group is configured of a negative lens having a concave surface on the enlargement side, and
   wherein, when the power of each of the lens groups is set to an absolute value of a reciprocal of a focal length of each of the lens groups, the power of the F2 lens group is lower than the power of the F1 lens group and the power of the F3 lens group.

4. The projection optical system according to claim 1, wherein the F2 lens group is configured of cemented lenses.

5. The projection optical system according to claim 1, wherein the 1-1st lens group has an aperture within the 1-1st lens group, and has, on the outermost enlargement side, a negative lens that has at least one surface having an aspheric shape.

6. The projection optical system according to claim 1, wherein the 1-1st lens group has an aperture within the 1-1st lens group, and, as a whole, is configured to have nine or less lenses, including, on the reduction side from the aperture, two positive lenses, first cemented lenses configured of a positive lens and a negative lens, and second cemented lenses configured of a positive lens and a negative lens.

7. The projection optical system according to claim 1, wherein the numerical aperture on an object side is equal to or higher than 0.3.

8. The projection optical system according to claim 1, wherein the reduction side is substantially telecentric.

9. The projection optical system according to claim 1, wherein each of a plurality of the lenses and the reflective surface are rotationally symmetric with respect to a common optical axis.

10. The projection optical system according to claim 1, wherein a range of magnification changes is equal to or greater than 1.5 times.

11. The projection optical system according to claim 1, wherein the 1-2nd lens group consists of three lens groups of an F1 lens group, an F2 lens lens group and an F3 lens group,
wherein the F3 lens group has an aspheric surface.

12. The projection optical system according to claim 11, wherein the F3 lens group is configured of a double-sided aspheric lens molded out of a resin.

13. The projection optical system according to claim 11, wherein the F1 lens group is configured of a positive lens having a convex surface on an enlargement side,
wherein the F2 lens group is configured of a positive lens having a convex surface on the reduction side and a negative lens having a concave surface on the reduction side,
wherein the F3 lens group is configured of a negative lens having a concave surface on the enlargement side, and
wherein, when the power of each of the lens groups is set to an absolute value of a reciprocal of a focal length of each of the lens groups, the power of the F2 lens group is lower than the power of the F1 lens group and the power of the F3 lens group.

14. The projection optical system according to claim 11, wherein the F2 lens group is configured of cemented lenses.

15. The projection optical system according to claim 11, wherein the 1-1st lens group has an aperture within the 1-1st lens group, and has, on the outermost enlargement side, a negative lens that has at least one surface having an aspheric shape.

16. The projection optical system according to claim 11, wherein the 1-1st lens group has an aperture within the 1-1st lens group, and, as a whole, is configured to have nine or less lenses, including, on the reduction side from the aperture, two positive lenses, first cemented lenses configured of a positive lens and a negative lens, and second cemented lenses configured of a positive lens and a negative lens.

17. The projection optical system according to claim 11, wherein the numerical aperture on an object side is equal to or higher than 0.3.

18. The projection optical system according to claim 11, wherein a range of magnification changes is equal to or greater than 1.5 times.

19. A projector comprising:
an optical modulator that modulates a beam from a beam source and forms an image beam; and
the projection optical system according to claim 1 that projects the image beam emitted from the optical modulator.

20. A projector comprising:
an optical modulator that modulates a beam from a beam source and forms an image beam; and
the projection optical system according to claim 11 that projects the image beam emitted from the optical modulator.

* * * * *